United States Patent
Henry et al.

(10) Patent No.: US 7,519,833 B2
(45) Date of Patent: *Apr. 14, 2009

(54) MICROPROCESSOR APPARATUS AND METHOD FOR ENABLING CONFIGURABLE DATA BLOCK SIZE IN A CRYPTOGRAPHIC ENGINE

(75) Inventors: G. Glenn Henry, Austin, TX (US); Thomas A. Crispin, Austin, TX (US); Terry Parks, Austin, TX (US)

(73) Assignee: Via Technologies, Inc., Taipei (TW)

( * ) Notice: Subject to any disclaimer, the term of this patent is extended or adjusted under 35 U.S.C. 154(b) by 752 days.

This patent is subject to a terminal disclaimer.

(21) Appl. No.: 10/826,433

(22) Filed: Apr. 16, 2004

(65) Prior Publication Data
US 2004/0252841 A1    Dec. 16, 2004

Related U.S. Application Data

(63) Continuation-in-part of application No. 10/674,057, filed on Sep. 29, 2003.

(60) Provisional application No. 60/506,971, filed on Sep. 29, 2003, provisional application No. 60/507,001, filed on Sep. 29, 2003, provisional application No. 60/506,978, filed on Sep. 29, 2003, provisional application No. 60/507,004, filed on Sep. 29, 2003, provisional application No. 60/507,002, filed on Sep. 29, 2003, provisional application No. 60/506,991, filed on Sep. 29, 2003, provisional application No. 60/507,003, filed on Sep. 29, 2003, provisional application No. 60/464,394, filed on Apr. 18, 2003, provisional application No. 60/506,979, filed on Sep. 29, 2003, provisional application No. 60/508,927, filed on Oct. 3, 2003, provisional application No. 60/508,679, filed on Oct. 3, 2003, provisional application No. 60/508,076, filed on Oct. 2, 2003, provisional application No. 60/508,604, filed on Oct. 3, 2003.

(51) Int. Cl.
*H04L 9/06*    (2006.01)

(52) U.S. Cl. ...................... 713/190; 380/264

(58) Field of Classification Search ................... 380/37, 380/43, 264; 713/190
See application file for complete search history.

(56) References Cited

U.S. PATENT DOCUMENTS 4,168,396 A    9/1979    Best (Continued)

FOREIGN PATENT DOCUMENTS

CN    1309351 A    8/2001

(Continued)

OTHER PUBLICATIONS

"IBM PCI Cryptographic Coprocessor CCA Basic Services Reference and Guide fo IBM 4758 Models 002 and 023 with Release 2.40," IBM, Sep. 2001, XP002291430.

(Continued)

*Primary Examiner*—Kimyen Vu
*Assistant Examiner*—Edward Zee
(74) *Attorney, Agent, or Firm*—Richard K. Huffman; James W. Huffman

(57) ABSTRACT

The present invention provides an apparatus and method for performing cryptographic operations on a plurality of input data blocks within a processor, where the size of the input data blocks is programmable. In one embodiment, an apparatus for performing cryptographic operations is provided. The apparatus includes fetch logic and execution logic. The fetch logic is disposed within a microprocessor and is configured to receive a cryptographic instruction single atomic cryptographic instruction as part of an instruction flow executing on the microprocessor. The cryptographic instructionsingle atomic cryptographic instruction prescribes one of the cryptographic operations, and also one of a plurality of data block sizes. The execution logic is disposed within the microprocessor and is operatively coupled to the single atomic cryptographic instruction. The execution logic executes the one of the cryptographic operations. The execution logic has a block size controller that employs the one of a plurality of data block sizes during execution of the one of the cryptographic operations.

26 Claims, 10 Drawing Sheets

U.S. PATENT DOCUMENTS

| | | | |
|---|---|---|---|
| 4,250,546 | A | 2/1981 | Boney et al. |
| 4,275,265 | A | 6/1981 | Davida et al. |
| 4,278,837 | A | 7/1981 | Best |
| 4,316,055 | A | 2/1982 | Feistel |
| 4,319,079 | A | 3/1982 | Best |
| 4,386,234 | A | 5/1983 | Ehrsam et al. |
| 4,465,901 | A | 8/1984 | Best |
| 4,633,388 | A | 12/1986 | Chiu |
| 4,668,103 | A | 5/1987 | Wilson |
| 4,888,802 | A | 12/1989 | Cooney |
| 5,016,276 | A | 5/1991 | Matumoto et al. |
| 5,020,106 | A | 5/1991 | Rabold et al. |
| 5,134,713 | A | 7/1992 | Miller et al. |
| 5,161,193 | A | 11/1992 | Lampson et al. |
| 5,218,637 | A | 6/1993 | Angebaud et al. |
| 5,265,164 | A | 11/1993 | Matyas et al. |
| 5,613,005 | A | 3/1997 | Murakami et al. |
| 5,615,263 | A | 3/1997 | Takahashi |
| 5,633,934 | A | 5/1997 | Hember |
| 5,666,411 | A | 9/1997 | McCarty |
| 5,673,319 | A | 9/1997 | Bellare et al. |
| 5,828,873 | A | 10/1998 | Lynch |
| 5,870,470 | A | 2/1999 | Johnson et al. |
| 6,006,328 | A | 12/1999 | Drake |
| 6,021,201 | A | 2/2000 | Bakhle et al. |
| 6,026,490 | A | 2/2000 | Johns-Vano et al. |
| 6,081,884 | A | 6/2000 | Miller |
| 6,088,800 | A | 7/2000 | Jones et al. |
| 6,101,255 | A | 8/2000 | Harrison et al. |
| 6,182,216 | B1 | 1/2001 | Luyster |
| 6,246,768 | B1* | 6/2001 | Kim ........................... 380/28 |
| 6,269,163 | B1 | 7/2001 | Rivest et al. |
| 6,301,362 | B1 | 10/2001 | Matyas, Jr. et al. |
| 6,324,286 | B1 | 11/2001 | Lai et al. |
| 6,434,699 | B1 | 8/2002 | Jones et al. |
| 6,570,988 | B1 | 5/2003 | Venkatesan et al. |
| 6,578,150 | B2 | 6/2003 | Luyster |
| 6,598,165 | B1 | 7/2003 | Galasso |
| 6,674,874 | B1 | 1/2004 | Yoshida et al. |
| 6,694,430 | B1 | 2/2004 | Zegelin et al. |
| 6,778,667 | B1 | 8/2004 | Bakhle et al. |
| 6,789,147 | B1 | 9/2004 | Kessler et al. |
| 6,795,930 | B1 | 9/2004 | Laurenti et al. |
| 6,861,865 | B1 | 3/2005 | Carlson |
| 6,919,684 | B2 | 7/2005 | Brandes |
| 6,973,187 | B2 | 12/2005 | Gligor et al. |
| 6,981,149 | B1 | 12/2005 | Housley et al. |
| 6,983,374 | B2 | 1/2006 | Hashimoto et al. |
| 7,054,445 | B2 | 5/2006 | Gligor et al. |
| 7,073,059 | B2 | 7/2006 | Worely et al. |
| 7,088,826 | B2 | 8/2006 | Houlberg et al. |
| 7,106,860 | B1* | 9/2006 | Yu et al. ..................... 380/37 |
| 7,110,545 | B2 | 9/2006 | Furuya et al. |
| 7,124,302 | B2 | 10/2006 | Ginter et al. |
| 7,137,004 | B2 | 11/2006 | England et al. |
| 7,184,549 | B2 | 2/2007 | Sorimachi et al. |
| 7,194,090 | B2 | 3/2007 | Muratani et al. |
| 7,205,785 | B1 | 4/2007 | Carlson |
| 7,221,763 | B2 | 5/2007 | Verbauwhede |
| 7,337,314 | B2 | 2/2008 | Hussain et al. |
| 2001/0033656 | A1 | 10/2001 | Gligor et al. |
| 2001/0037450 | A1 | 11/2001 | Metlitski et al. |
| 2001/0046292 | A1 | 11/2001 | Gligor et al. |
| 2001/0050989 | A1* | 12/2001 | Zakiya ........................ 380/29 |
| 2002/0048364 | A1 | 4/2002 | Gligor et al. |
| 2002/0101985 | A1 | 8/2002 | Calvignec et al. |
| 2002/0110239 | A1 | 8/2002 | Venkatesan et al. |
| 2002/0162026 | A1 | 10/2002 | Neuman et al. |
| 2002/0191784 | A1* | 12/2002 | Yup et al. ..................... 380/37 |
| 2003/0039354 | A1 | 2/2003 | Kimble et al. |
| 2003/0097579 | A1 | 5/2003 | England et al. |
| 2003/0202658 | A1* | 10/2003 | Verbauwhede ............... 380/43 |
| 2003/0223580 | A1 | 12/2003 | Snell |
| 2004/0047466 | A1* | 3/2004 | Feldman et al. ............... 380/37 |
| 2004/0103263 | A1 | 5/2004 | Colavin et al. |
| 2004/0202317 | A1* | 10/2004 | Demjanenko et al. ......... 380/28 |
| 2004/0202319 | A1 | 10/2004 | Hussain et al. |
| 2004/0205331 | A1 | 10/2004 | Hussain et al. |
| 2005/0060558 | A1 | 3/2005 | Hussain et al. |
| 2005/0084076 | A1* | 4/2005 | Dhir et al. .................. 379/55.1 |
| 2006/0056623 | A1 | 3/2006 | Gligor et al. |
| 2008/0031454 | A1 | 2/2008 | Verbauwhede |

FOREIGN PATENT DOCUMENTS

| | | |
|---|---|---|
| CN | 1431584 A | 7/2003 |
| DE | 3432721 A1 | 3/1986 |
| EP | 0913767 A2 | 5/1999 |
| EP | 1202150 A2 | 5/2002 |
| EP | 1215842 | 6/2002 |
| EP | 1271839 | 1/2003 |
| EP | 1298518 A2 | 4/2003 |
| EP | 1351432 A | 10/2003 |
| JP | 57176457 | 10/1982 |
| WO | WO0076119 A1 | 12/2000 |
| WO | WO0117152 | 3/2001 |
| WO | WO0144900 A2 | 6/2001 |
| WO | WO0184769 A | 11/2001 |
| WO | WO03036508 | 5/2003 |

OTHER PUBLICATIONS

Schneier: "Applied Cryptography." 1996. John Wiley & Sons, New York, US. XP002341498. pp. 30-31, pp. 189-211, pp. 446-459.

Schneier. "Applied Cryptography, Protocols, Algorithms and Source Code in C." 2nd edition 2.3 One Way Funtions Applied Cryptography. Oct. 18, 1995. pp. 29-31, 193. XP002224472.

Rechenberg et al. "Informatik-Handbuch" Informatik-Handbuch, 2002, XP0023666659. p. 304-p. 324.

Institute for Applied Information Processing and Communications, Tu Graz: "Cryptographic Logic Unit /Crypto Unit Macrocell Webpages." Cryptographic Reduced Instruction Set Processor Smartcard, online Apr. 12, 2000. XP00236660 Retrieved from the Internet: URL: http://web.archive.org/web/20000412010535 http://www.iaik.tu-graz.ac.at/Research/VLSI/CRISP/crisp.htm retrieved on Feb. 7, 2006! p. 8.

"Secure Microcontrollers for Smart Cards. AT90SC Summary" Announcement ATMEL, 1999, pp. 1-7. XP002291271.

Ulmann, B. "Designing a Nice Processor." Microprocessors and Microsystems, IPC Business Press Ltd. London, GB. vol. 23, No. 5. Oct. 25, 1999. pp. 257-264, XP004321479 ISSN: 0141-9331.

Wu et al. "CryptoManiac: a fast flexible architecture for secure communication." Proceedings of the 28th. International Symposium on Computer Architecture. ISCA 2001. Jun. 30, 2001 pp. 104-113, XP010553867.

Gladman, Brian. "A Specification for Rijndael, the AES Algorithm." Online. Mar. 13, 2003. XP002376287.

Backhus E. "AES in FPGAS Implementierung Des Advanced Encryption Standards in Hardware." Elektronik, WEKA Fachzeitschriftenverlag, Poing, DE. vol. 52, No. 8. Apr. 15, 2003 pp. 54-56, 58, 60. XP001160048.

Daemon J et al. "AES Proposal: Rijndael." AES Proposal Sep. 3, 1999. pp. 1-45, XP001060386.

Tong et al. "A system level implementation of Rijndael on a memory-slot based FPGA card." Field-Programmable Technology, 2002. (FPT). Dec. 16, 2002, pp. 102-109, XP010636515 ISBN: 0-7803-7574-2.

Taylor D E et al. "Dynamic Hardware Plugins: Exploiting Reconfigurable Hardware for High-Performance Programmable Routers." Computer Networks, Elsevier Science Publishers B.V., Amsterdam, NL, vol. 38, No. 3. Feb. 21, 2002 pp. 295-310. XP004333786. ISSN: 1389-1286.

Elbirt A J et al. "Instruction-Level Distributed Processing for Symmetric-Key Cryptography." Parallel and Distributed Processing Symposium. 2003. Apr. 22, 2003. pp. 78-87. XP010645610 ISBN: 0-7695-1926-1.

McKinnon et al. "A Configurable Middleware Framework with Multiple Quality of Service Properties for Small Embedded Systems." Network Computing and Applications, 2003. NCA 2003. Second IEEE International Symposium on Apr. 16-18, 2003, Piscataway, NJ, USA IEEE, Apr. 16, 2003. pp. 197-204, XP010640251 ISBN: 0-7695-1938-5.

Lee et al. "Efficient Permutation Instructions for Fast Software Cryptography." IEEE Micro, Nov. 2001. pp. 56-69.

Dimond et al. "Application-specific Customisation of Multi-Threaded Soft Processors." Computers and Digital Techniques. IEEE Proceedings. vol. 153, Issue 3. May 2, 2006. pp. 173-180.

Anderson et al. "Cryptographic Processors—A Survey." Proceedings of the IEEE. vol. 94, Issue 2. Feb. 2006. pp. 357-369.

Eberle et al. "Architectural Extensions for Elliptic Curve Cryptography over $GF(2^M)$ on 8-bit Microprocessors." Application-Specific Systems. Architecture Processors. 2005. ASAP 2005. 16th IEEE International Conference on Jul. 23-25, 2005. pp. 343-349.

Kuhn, Markus G. "Cipher Instruction Search Attack on the Bus-Encryption Security Microcontroller DS5002FP." Computers, IEEE Transactions on vol. 47, Issue 10. Oct. 1998. pp. 1153-1157.

Fischer et al. "Two Methods of Rijndael Implementation in Reconfigurable Hardware." Springer-verlag Berlin Heidelberg 2001. CHES 2001. LNCS 2162. pp. 77-92.

Kim, Ho Won et al. "Design and Implementation of a Private and Public Key Crypto Porcessor and Its Application to a Security System." IEEE Transactions on Consumer Electronics. vol. 50, No. 1, Feb. 2004. pp. 214-224.

Goots, N.D et al. "Fast DDP-based Ciphers: from Hardware to Software." Circuits and Systems. 2003. MWSCAS '03. Proceedings of the 46th IEEE International Midwest Symposium on vol. 2, Dec. 27-30, 2003 pp. 770-773 vol. 2.

Suwartadi, E. et al. "First Step Toward Internet Based Embedded Control System." Control Conference, 2004. 5th Asian. vol. 2, Jul. 20-23, 2004, pp. 1226-1231.

Michalsi, A. et al. "High-throughput Reconfigurable Computing: Design and Implementation of an Idea Encryption Cryptosystem on the SRC-6E Reconfigurable Computer." Field Programmable Logic and Applications, 2005. International Conference on Aug. 24-26, 2005 pp. 681-686.

* cited by examiner

| BCM VALUE | MODE |
|---|---|
| 0xC8 | ELECTRONIC CODE BOOK (ECB) |
| 0xD0 | CIPHER BLOCK CHAINING (CBC) |
| 0xE0 | CIPHER FEEDBACK (CFB) |
| 0xE8 | OUTPUT FEEDBACK (OFB) |
| ALL OTHER VALUES | RESERVED |

```
         ┌─701       ┌─702      ┌─703
    ┌──────────────┬─────────┬──────────┐
    │ MICRO OPCODE │ DATAREG │ REGISTER │
    └──────────────┴─────────┴──────────┘
    ├──14 BITS────┼─5 BITS──┼─3 BITS─┤
```

*FIG. 7*

| VALUE | OPERATION |
|-------|-----------|
| 000 | RESERVED |
| 001 | RESERVED |
| 010 | LOAD CONTROL WORD (CW) REGISTER |
| 011 | RESERVED |
| 100 | LOAD INPUT-0 (IN-0) REGISTER AND START CRYPTOGRAPHY UNIT |
| 101 | LOAD INPUT-1 (IN-1) REGISTER |
| 110 | LOAD CRYPTO KEY-0 REGISTER (LOWER 128 BITS OF KEY) |
| 111 | LOAD CRYPTO KEY-1 REGISTER (UPPER 128 BITS OF KEY) |

*FIG. 8*

| VALUE | OPERATION |
|-------|-----------|
| 000 | RESERVED |
| 001 | RESERVED |
| 010 | RESERVED |
| 011 | RESERVED |
| 100 | STORE OUTPUT-0 (OUT-0) REGISTER |
| 101 | STORE OUTPUT-1 (OUT-1) REGISTER |
| 110 | RESERVED |
| 111 | RESERVED |

*FIG. 9*

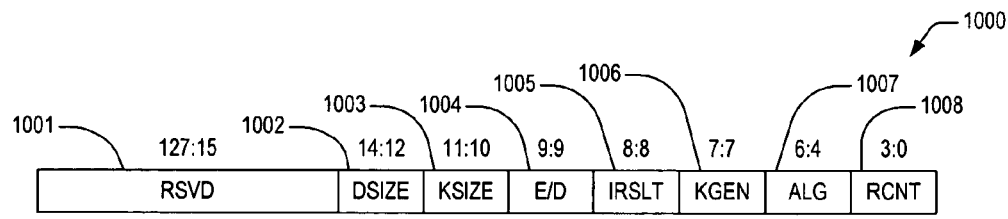
FIG. 10
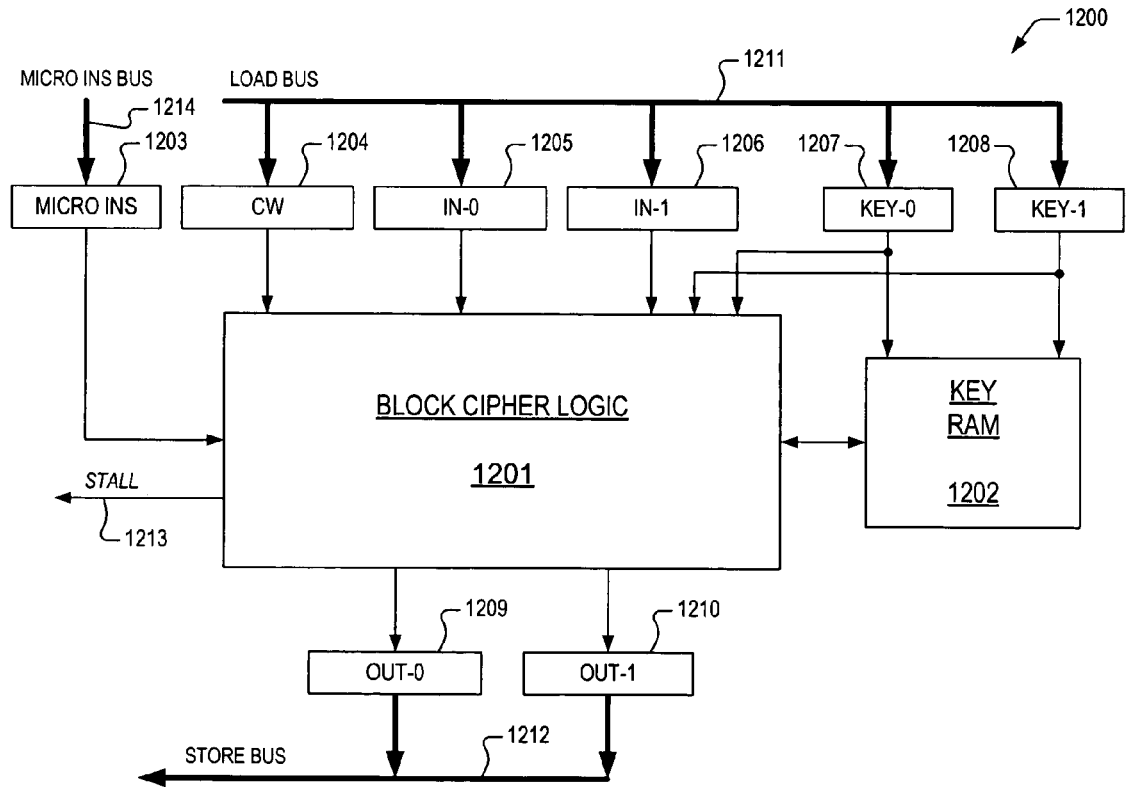
FIG. 11
FIG. 12

MICROPROCESSOR APPARATUS AND METHOD FOR ENABLING CONFIGURABLE DATA BLOCK SIZE IN A CRYPTOGRAPHIC ENGINE

CROSS-REFERENCE TO RELATED APPLICATIONS

This application claims the benefit of the following U.S. Provisional Applications, which are herein incorporated by reference for all intents and purposes.

| SERIAL NUMBER | FILING DATE | TITLE |
| --- | --- | --- |
| 60/506971 | Sep. 29, 2003 | MICROPROCESSOR APPARATUS AND METHOD FOR OPTIMIZING BLOCK CIPHER CRYPTOGRAPHIC FUNCTIONS |
| 60/507001 | Sep. 29, 2003 | APPARATUS AND METHOD FOR PERFORMING OPERATING SYSTEM TRANSPARENT BLOCK CIPHER CRYPTOGRAPHIC FUNCTIONS |
| 60/506978 | Sep. 29, 2003 | MICROPROCESSOR APPARATUS AND METHOD FOR EMPLOYING CONFIGURABLE BLOCK CIPHER CRYPTOGRAPHIC ALGORITHMS |
| 60/507004 | Sep. 29, 2003 | APPARATUS AND METHOD FOR PROVIDING USER-GENERATED KEY SCHEDULE IN A MICROPROCESSOR CRYPTOGRAPHIC ENGINE |
| 60/507002 | Sep. 29, 2003 | MICROPROCESSOR APPARATUS AND METHOD FOR PROVIDING CONFIGURABLE CRYPTOGRAPHIC BLOCK CIPHER ROUND RESULTS |
| 60/506991 | Sep. 29, 2003 | MICROPROCESSOR APPARATUS AND METHOD FOR ENABLING CONFIGURABLE DATA BLOCK SIZE IN A CRYPTOGRAPHIC ENGINE |
| 60/507003 | Sep. 29, 2003 | APPARATUS FOR ACCELERATING BLOCK CIPHER CRYPTOGRAPHIC FUNCTIONS IN A MICROPROCESSOR |
| 60/464394 | Apr. 18, 2003 | ADVANCED CRYPTOGRAPHY UNIT |
| 60/506979 | Sep. 29, 2003 | MICROPROCESSOR APPARATUS AND METHOD FOR PROVIDING CONFIGURABLE CRYPTOGRAPHIC KEY SIZE |
| 60/508927 | Oct. 3, 2003 | APPARATUS AND METHOD FOR PERFORMING OPERATING SYSTEM TRANSPARENT CIPHER BLOCK CHAINING MODE CRYPTOGRAPHIC FUNCTIONS |
| 60/508679 | Oct. 3, 2003 | APPARATUS AND METHOD FOR PERFORMING OPERATING SYSTEM TRANSPARENT CIPHER FEEDBACK MODE CRYPTOGRAPHIC FUNCTIONS |
| 60/508076 | Oct. 2, 2003 | APPARATUS AND METHOD FOR PERFORMING OPERATING SYSTEM TRANSPARENT OUTPUT FEEDBACK MODE CRYPTOGRAPIC FUNCTIONS |
| 60/508604 | Oct. 3, 2003 | APPARATUS AND METHOD FOR GENERATING A CRYPTOGRAPHIC KEY SCHEDULE IN A MICROPROCESSOR |

This application is a continuation-in-part of the following co-pending U.S. Patent Applications, all of which have a common assignee and common inventors.

| SERIAL NUMBER | FILING DATE | TITLE |
| --- | --- | --- |
| 10/674057 | Sep. 29, 2003 | MICROPROCESSOR APPARATUS AND METHOD FOR PERFORMING BLOCK CIPHER CRYPTOGRAPHIC FUNCTIONS |

This application is related to the following co-pending U.S. patent applications, all of which have a common assignee and common inventors.

| SERIAL NUMBER | FILING DATE | TITLE |
| --- | --- | --- |
| 10/730167 | Dec. 5, 2003 | MICROPROCESSOR APPARATUS AND METHOD FOR PERFORMING BLOCK CIPHER CRYPTOGRAPHIC FUNCTIONS |
| 10800768 | Mar. 15, 2004 | MICROPROCESSOR APPARATUS AND METHOD FOR OPTIMIZING BLOCK CIPHER CRYPTOGRAPHIC FUNCTIONS |
| 10/727973 | Dec. 4, 2003 | APPARATUS AND METHOD FOR PERFORMING TRANSPARENT BLOCK CIPHER CRYPTOGRAPHIC FUNCTIONS |
| 10/800938 | Mar. 15, 2004 | MICROPROCESSOR APPARATUS AND METHOD FOR EMPLOYING CONFIGURABLE BLOCK CIPHER CRYPTOGRAPHIC ALGORITHMS |
| 10/800983 | Mar. 15, 2004 | APPARATUS AND METHOD FOR PROVIDING USER-GENERATED KEY SCHEDULE IN A MICROPROCESSOR CRYPTOGRAPHIC ENGINE |
| 10/826,435 | HEREWITH | MICROPROCESSOR APPARATUS AND METHOD FOR PROVIDING CONFIGURABLE CRYPTOGRAPHIC BLOCK CIPHER ROUND RESULTS |
| 10/826,475 | HEREWITH | MICROPROCESSOR APPARATUS AND METHOD FOR PROVIDING CONFIGURABLE CRYPTOGRAPHIC KEY SIZE |
| 10/826,814 | HEREWITH | APPARATUS AND METHOD FOR PERFORMING TRANSPARENT CIPHER BLOCK CHAINING MODE CRYPTOGRAPHIC FUNCTIONS |
| 10/826,428 | HEREWITH | APPARATUS AND METHOD FOR PERFORMING TRANSPARENT CIPHER FEEDBACK MODE CRYPTOGRAPHIC FUNCTIONS |
| 10/826,745 | HEREWITH | APPARATUS AND METHOD FOR PERFORMING TRANSPARENT OUTPUT FEEDBACK MODE CRYPTOGRAPIC FUNCTIONS |
| 10/826,632 | HEREWITH | APPARATUS AND METHOD FOR GENERATING A CRYPTOGRAPHIC KEY SCHEDULE IN A MICROPROCESSOR |

BACKGROUND OF THE INVENTION

1. Field of the Invention

This invention relates in general to the field of microelectronics, and more particularly to an apparatus and method for performing cryptographic operations in a computing device that allows the size of the data blocks worked upon to be programmed at the instruction level.

2. Description of the Related Art

An early computer system operated independently of other computer systems in the sense that all of the input data required by an application program executing on the early computer system was either resident on that computer system or was provided by an application programmer at run time. The application program generated output data as a result of being executed and the output data was generally in the form of a paper printout or a file which was written to a magnetic tape drive, disk drive, or other type of mass storage device that was part of the computer system. The output file could then be used as an input file to a subsequent application program that was executed on the same computer system or, if the output data was previously stored as a file to a removable or transportable mass storage device, it could then be provided to a different, yet compatible, computer system to be employed by application programs thereon. On these early systems, the need for protecting sensitive information was recognized and, among other information security measures, cryptographic application programs were developed and employed to protect the sensitive information from unauthorized disclosure. These cryptographic programs typically scrambled and unscrambled the output data that was stored as files on mass storage devices.

It was not many years thereafter before users began to discover the benefits of networking computers together to provide shared access to information. Consequently, network architectures, operating systems, and data transmission protocols commensurately evolved to the extent that the ability to access shared data was not only supported, but prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized disclosure has grown dramatically. The number of instances during a given computer session where a user is obliged to protect his or her sensitive data has substantially increased. Current news headlines regularly force computer information security issues such as spam, hacking, identity theft, reverse engineering, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the protection of proprietary information.

The field of information security that provides us with techniques and means to encode data so that it can only be decoded by specified individuals is known as cryptography. When particularly applied to protecting information that is stored on or transmitted between computers, cryptography most often is utilized to transform sensitive information (known in the art as "plaintext" or "cleartext") into an unintelligible form (known in the art as "ciphertext"). The transformation process of converting plaintext into ciphertext is called "encryption," "enciphering," or "ciphering" and the reverse transformation process of converting ciphertext back into plaintext is referred to as "decryption," "deciphering," or "inverse ciphering."

Within the field of cryptography, several procedures and protocols have been developed that allow for users to perform cryptographic operations without requiring great knowledge or effort and for those users to be able to transmit or otherwise provide their information products in encrypted forms to different users. Along with encrypted information, a sending user typically provides a recipient user with a "cryptographic key" that enables the recipient user to decipher the encrypted information thus enabling the recipient user to recover or otherwise gain access to the unencrypted original information. One skilled in the art will appreciate that these procedures and protocols generally take the form of password protection, mathematical algorithms, and application programs specifically designed to encrypt and decrypt sensitive information.

Several classes of algorithms are currently used to encrypt and decrypt data. Algorithms according to one such class (i.e., public key cryptographic algorithms, an instance of which is the Rivest, Shamir, Adlernen (RSA) algorithm) employ two cryptographic keys, a public key and a private key, to encrypt or decrypt data. According to some of the public key algorithms, a recipient's public key is employed by a sender to encrypt data for transmission to the recipient. Because there is a mathematical relationship between a user's public and private keys, the recipient must employ his private key to decrypt the transmission in order to recover the data. Although this class of cryptographic algorithms enjoys widespread use today, encryption and decryption operations are exceedingly slow even on small amounts of data. A second class of algorithms, known as symmetric key algorithms, provide commensurate levels of data security and can be executed much faster. These algorithms are called symmetric key algorithms because they use a single cryptographic key to both encrypt and decrypt information. In the public sector, there are currently three prevailing single-key cryptographic algorithms: the Data Encryption Standard (DES), Triple DES, and the Advanced Encryption Standard (AES). Because of the strength of these algorithms to protect sensitive data, they are used now by U.S. Government agencies, but it is anticipated by those in the art that one or more of these algorithms will become the standard for commercial and private transactions in the near future. According to all of these symmetric key algorithms, plaintext and ciphertext is divided into blocks of a specified size for encryption and decryption. For example, AES performs cryptographic operations on blocks 128 bits in size, and uses cryptographic key sizes of 128-, 192-, and 256-bits. Other symmetric key algorithms such as the Rijndael Cipher allow for 192- and 256-bit data blocks as well. Accordingly, for a block encryption operation, a 1024-bit plaintext message is encrypted as eight 128-bit blocks.

All of the symmetric key algorithms utilize the same type of sub-operations to encrypt a block of plaintext. And according to many of the more commonly employed symmetric key algorithms, an initial cryptographic key is expanded into a plurality of keys (i.e., a "key schedule"), each of which is employed as a corresponding cryptographic "round" of sub-operations is performed on the block of plaintext. For instance, a first key from the key schedule is used to perform a first cryptographic round of sub-operations on the block of plaintext. The result of the first round is used as input to a second round, where the second round employs a second key from the key schedule to produce a second result. And a specified number of subsequent rounds are performed to yield a final round result which is the ciphertext itself. According to the AES algorithm, the sub-operations within each round are referred to in the literature as SubBytes (or S-box), ShiftRows, MixColums, and AddRoundKey. Decryption of a block of ciphertext is similarly accomplished with the exceptions that the ciphertext is the input to the inverse cipher and inverse sub-operations are performed (e.g., Inverse MixColumns, Inverse ShiftRows) during each of the rounds, and the final result of the rounds is a block of plaintext.

DES and Triple-DES utilize different specific sub-operations, but the sub-operations are analogous to those of AES because they are employed in a similar fashion to transform a block of plaintext into a block of ciphertext.

To perform cryptographic operations on multiple successive blocks of text, all of the symmetric key algorithms employ the same types of modes. These modes include electronic code book (ECB) mode, cipher block chaining (CBC) mode, cipher feedback (CFB) mode, and output feedback (OFB) mode. Some of these modes utilize an additional initialization vector during performance of the sub-operations and some use the ciphertext output of a first set of cryptographic rounds performed on a first block of plaintext as an additional input to a second set of cryptographic rounds performed on a second block of plaintext. It is beyond the scope of the present application to provide an in depth discussion of each of the cryptographic algorithms and sub-operations employed by present day symmetric key cryptographic algorithms. For specific implementation standards, the reader is directed to Federal Information Processing Standards Publication 46-3 (FLPS-46-3), dated Oct. 25, 1999 for a detailed discussion of DES and Triple DES, and Federal Information Processing Standards Publication 197 (FIPS-197), dated Nov. 26, 2001 fix a detailed discussion of AES. Both of the aforementioned standards are issued and maintained by the National Institute of Standards and Technology (NIST) and are herein incorporated by reference for all intents and purposes. In addition to the aforementioned standards, tutorials, white papers, toolkits, and resource articles can be obtained from NIST's Computer Security Resource Center (CSRC) over the Internet.

One skilled in the art will appreciate that there are numerous application programs available for execution on a computer system that can perform cryptographic operations (i.e., encryption and decryption). In fact, some operating systems (e.g. Microsoft® WindowsXP®, LINUX™) provide direct encryption/decryption services in the form of cryptographic primitives, cryptographic application program interfaces, and the like. The present inventors, however, have observed that present day computer cryptography techniques are deficient in several respects. Thus, the reader's attention is directed to FIG. 1, whereby these deficiencies are highlighted and discussed below.

FIG. 1 is a block diagram 100 illustrating present day computer cryptography applications. The block diagram 100 depicts a first computer workstation 101 connected to a local area network 105. Also connected to the network 105 is a second computer workstation 102, a network file storage device 106, a first router 107 or other form of interface to a wide area network (WAN) 110 such as the Internet, and a wireless network router 108 such as one of those compliant with Institute of Electrical and Electronics Engineers (IEEE) Standard 802.11. A laptop computer 104 interfaces to the wireless router 108 over a wireless network 109. At another point on the wide area network 110, a second router 111 provides interface for a third computer workstation 103.

As alluded to above, a present day user is confronted with the issue of computer information security many times during a work session. For example, under the control of a present day multi-tasking operating system, a user of workstation 101 can be performing several simultaneous tasks, each of which require cryptographic operations. The user of workstation 101 is required to run an encryption/decryption application 112 (either provided as part of the operating system or invoked by the operating system) to store a local file on the network file storage device 106. Concurrent with the file storage, the user can transmit an encrypted message to a second user at workstation 102, which also requires executing an instance of the encryption/decryption application 112. The encrypted message may be real-time (e.g., an instant message) or non-real-time (i.e. email). In addition, the user can be accessing or providing his/her financial data (e.g., credit card numbers, financial transactions, etc.) or other forms of sensitive data over the WAN 110 from workstation 103. Workstation 103 could also represent a home office or other remote computer 103 that the user of workstation 101 employs when out of the office to access any of the shared resources 101, 102, 106 107, 108, 109 on local area network 105. Each of these aforementioned activities requires that a corresponding instance of the encryption/decryption application 112 be invoked. Furthermore, wireless networks 109 are now being routinely provided in coffee shops, airports, schools, and other public venues, thus prompting a need for a user of laptop 104 to encrypt/decrypt not only his/her messages to/from other users, but to encrypt and decrypt all communications over the wireless network 109 to the wireless router 108.

One skilled in the art will therefore appreciate that along with each activity that requires cryptographic operations at a given workstation 101-104, there is a corresponding requirement to invoke an instance of the encryption/decryption application 112. Hence, a computer 101-104 in the near future could potentially be performing hundreds of concurrent cryptographic operations.

The present inventors have noted several limitations to the above approach of performing cryptographic operations by invoking one or more instances of an encryption/decryption application 112 on a computing system 101-104. For example, performing a prescribed function via programmed software is exceedingly slow compared to performing that same function via dedicated hardware. Each time the encryption/decryption application 112 is required, a current task executing on a computer 101-104 must be suspended from execution, and parameters of the cryptographic operation (i.e., plaintext, ciphertext, mode, key, etc.) must be passed through the operating system to the instance of the encryption/decryption application 112, which is invoked for accomplishment of the cryptographic operation. And because cryptographic algorithms necessarily involve many rounds of sub-operations on a particular block of data, execution of the encryption/decryption applications 112 involves the execution of numerous computer instructions to the extent that overall system processing speed is disadvantageously affected. One skilled in the art will appreciate that sending a small encrypted email message in Microsoft® Outlook® can take up to five times as long as sending an unencrypted email message.

In addition, current techniques are limited because of the delays associated with operating system intervention. Most application programs do not provide integral key generation or encryption/decryption components; they employ components of the operating system or plug-in applications to accomplish these tasks. And operating systems are otherwise distracted by interrupts and the demands of other currently executing application programs.

Furthermore, the present inventors have noted that the accomplishment of cryptographic operations on a present day computer system 101-104 is very much analogous to the accomplishment of floating point mathematical operations prior to the advent of dedicated floating point units within microprocessors. Early floating point operations were performed via software and hence, they executed very slowly. Like floating point operations, cryptographic operations performed via software are disagreeably slow. As floating point technology evolved further, floating point instructions were provided for execution on floating point co-processors. These floating point co-processors executed floating point operations much faster than software implementations, yet they added cost to a system. Likewise, cryptographic co-processors exist today in the form of add-on boards or external devices that interface to a host processor via parallel ports or other interface buses (e.g., Universal Serial Bus (USB)). These co-processors certainly enable the accomplishment of cryptographic operations much faster than pure software implementations. But cryptographic co-processors add cost to a system configuration, require extra power, and decrease the overall reliability of a system. Cryptographic co-processor implementations are additionally vulnerable to snooping because the data channel is not on the same die as the host microprocessor.

Therefore, the present inventors recognize a need for dedicated cryptographic hardware within a present day microprocessor such that an application program that requires a cryptographic operation can direct the microprocessor to perform the cryptographic operation via a single, atomic, cryptographic instruction. The present inventors also recognize that such a capability should be provided so as to limit requirements for operating system intervention and management. Also, it is desirable that the cryptographic instruction be available for use at an application program's privilege level and that the dedicated cryptographic hardware comport with prevailing architectures of present day microprocessors. There is also a need to provide the cryptographic hardware and associated cryptographic instruction in a manner that supports compatibility with legacy operating systems and applications. It is moreover desirable to provide an apparatus and method for performing cryptographic operations that is resistant to unauthorized observation, that can support and is programmable with respect to multiple cryptographic algorithms, that supports verification and testing of the particular cryptographic algorithm that is embodied thereon, that allows for user-provided keys as well as self-generated keys, that supports multiple data block sizes and key sizes, and that provides for programmable block encryption/decryption modes such as ECB, CBC, CFB, and OFB.

SUMMARY OF THE INVENTION

The present invention, among other applications, is directed to solving these and other problems and disadvantages of the prior art. The present invention provides a superior technique for performing cryptographic operations within a microprocessor. In one embodiment, an apparatus for performing cryptographic operations is provided. The apparatus includes a fetch logic, translation logic, and execution logic. The fetch logic is disposed with in a microprocessor and is configured to receive a cryptographic instruction-single atomic cryptographic instruction as part of an instruction flow executing on the microprocessor. The single atomic cryptographic instruction prescribes one of the cryptographic operations, and also one of a plurality of data block sizes. The translation logic is coupled to the fetch logic, and is configured to translate the single atomic cryptographic instruction into a sequence of micro instructions that directs the microprocessor to perform the one of the cryptographic operations. The execution logic is disposed within the microprocessor and is operatively coupled to the single atomic cryptographic instruction. The execution logic executes the one of the cryptographic operations. The execution logic controller that employs the one of a plurality of data block sizes during execution of the includes a cryptography unit, configured execute a plurality of cryptographic rounds on each of plurality of input text blocks to generate a corresponding each of a plurality of ouput test blocks, where the one of a plurality of data block sizes is prescribed by a control work that is provided to a block size controller within the cryptography unit, and where the block size controller employs the one of a plurality of data block sizes during execution of the one of the cryptographic operations.

One aspect of the present invention contemplates an apparatus for performing cryptographic operations. The apparatus has a cryptography unit disposed within execution logic in within a microprocessor and block size logic. The cryptography unit executes one of the cryptographic operations responsive to receipt by the microprocessor of a cryptographic instruction single atomic cryptographic instruction within an instruction flow that prescribes the one of the cryptographic operations. The single atomic cryptographic instruction is fetched from memory by fetch logic in the microprocessor. The cryptographic instructionsingle atomic cryptographic instruction also prescribes a block size to be employed when executing the one of the cryptographic operations. Translation logic in the microprocessor translates the single atomic cryptographic instruction into a sequence of micro instructions that directs the microprocessor to perform the one of the cryptographic operations. The block size logic is operatively coupled within the cryptography unit. The block size logic directs the device to employ the block size when performing the one of the cryptographic operations.

Another aspect of the present invention provides a method for performing cryptographic operations in a device. The method includes, within a microprocessor, fetching a cryptographic instructionsingle atomic cryptographic instruction from memory that prescribes employment of particular data block size during execution of one of a plurality of cryptographic operations, and translating the single atomic cryptographic instruction into a sequence of micro instructions that direct the microprocessor to perform the one of the plurality of cryptographic operations; and, via a cryptography unit disposed within execution logic in the microprocessor, within the microprocessor, executing the employing the particular data block size when performing the one of the cryptographic operations.

BRIEF DESCRIPTION OF THE DRAWINGS

These and other objects, features, and advantages of the present invention will become better understood with regard to the following description, and accompanying drawings where:

FIG. 7 is a diagram illustrating fields within an exemplary micro instruction for directing cryptographic sub-operations within the microprocessor of FIG. 6;

FIG. 8 is a table depicting values of the register field for an XLOAD micro instruction according to the format of FIG. 7;

FIG. 9 is a table showing values of the register field for an XSTOR micro instruction according to the format of FIG. 7;

FIG. 10 is diagram highlighting an exemplary control word format for prescribing cryptographic parameters of a cryptography operation according to the present invention;

FIG. 11 is a table depicting values of the DSIZE field for a control word according to FIG. 10;

FIG. 12 is a block diagram featuring details of an exemplary cryptography unit according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
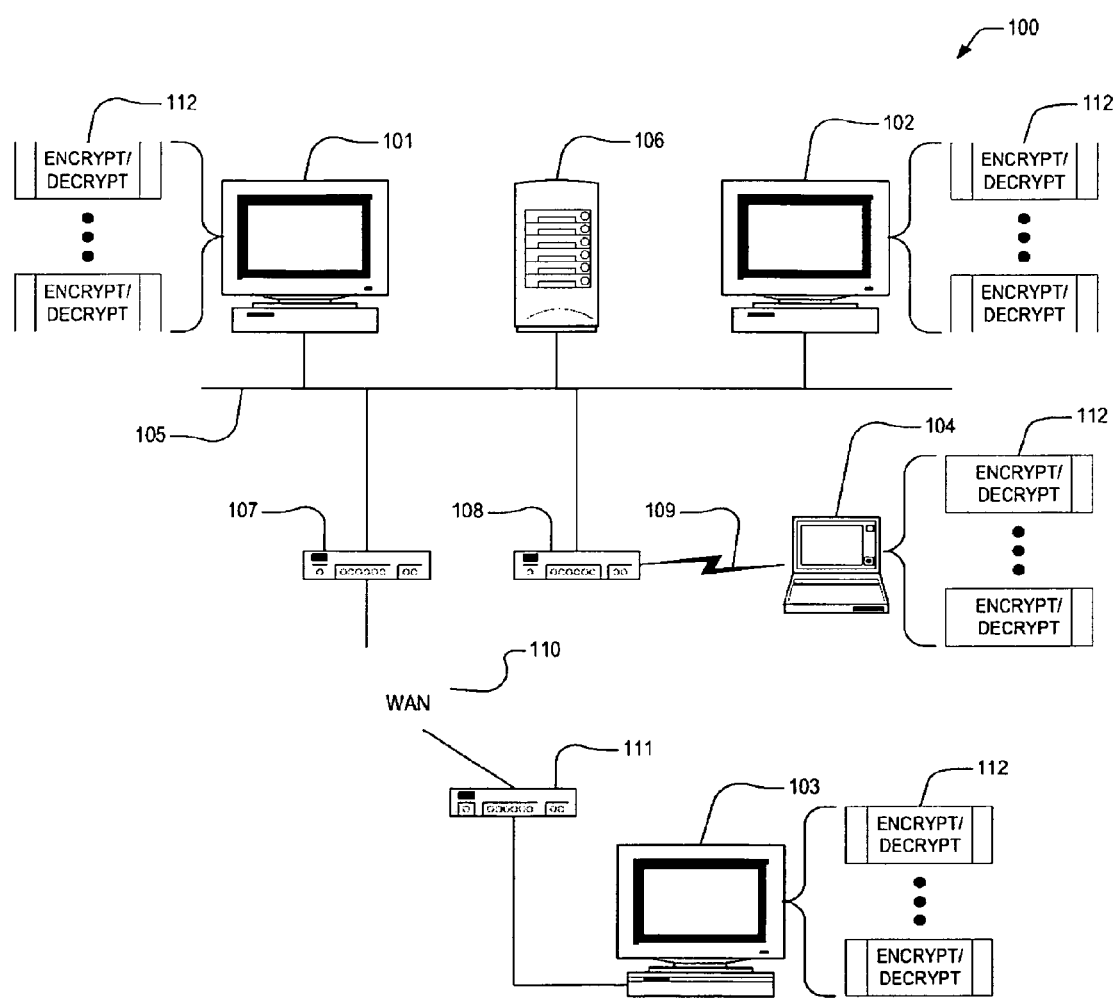
FIG. 1 is a block diagram illustrating present day cryptography applications.
Figure 2:
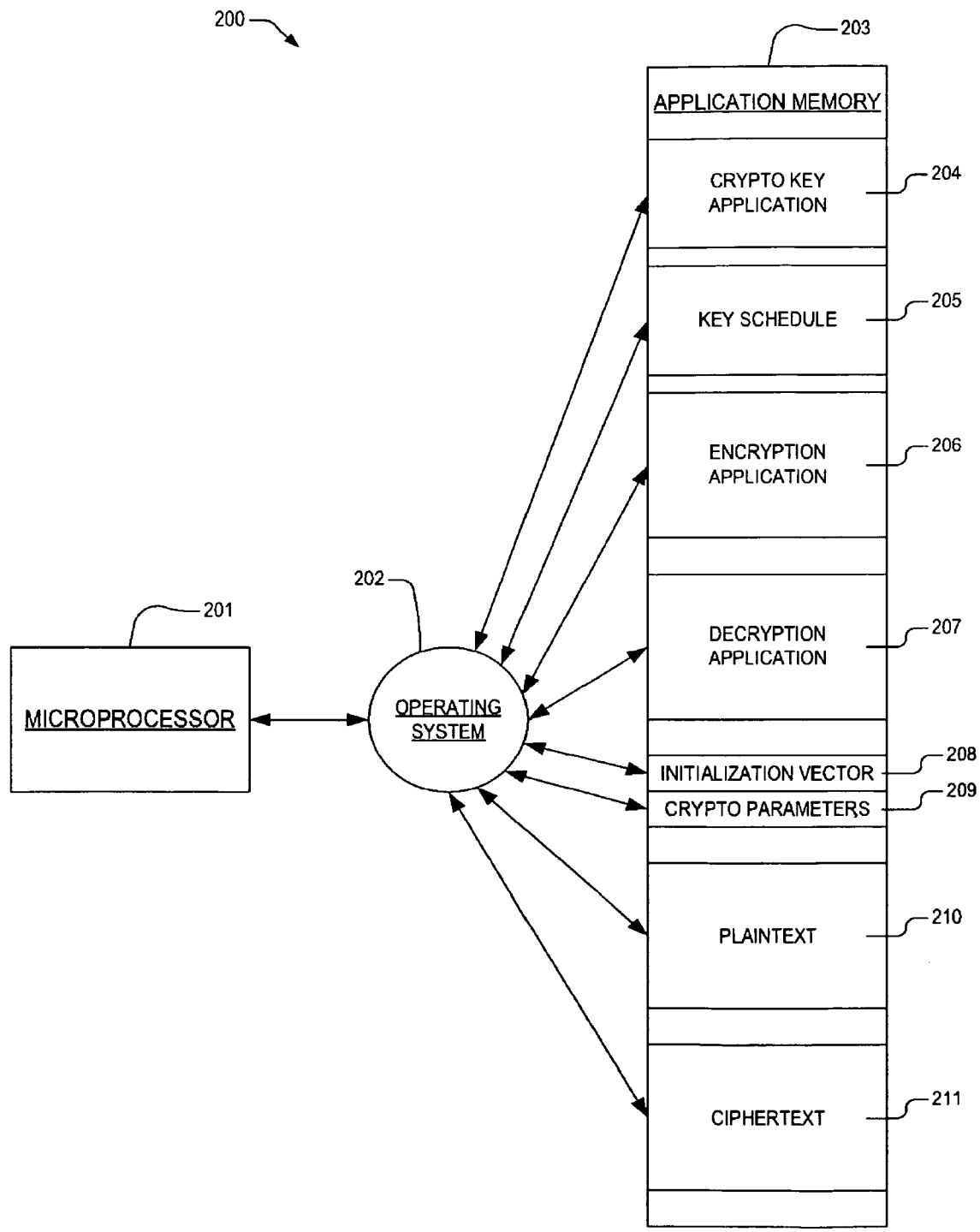
FIG. 2 is a block diagram depicting techniques for performing cryptographic operations.

In view of the above background discussion on cryptographic operations and associated techniques employed within present day computer systems to encrypt and decrypt data, the discussion of these techniques and their limitations will now be continued with reference to FIG. 2. Following this, the present invention will be discussed with reference to FIGS. 3-15. The present invention provides an apparatus and method for performing cryptographic operations in a present day computer system that exhibits superior performance characteristics over prevailing mechanisms and furthermore satisfies the above noted goals of limiting operating system intervention, atomicity, legacy and architectural compatibility, algorithmic and mode programmability, hack resistance, and testability.

Now turning to FIG. 2, a block diagram 200 is presented depicting techniques for performing cryptographic operations in a present day computer system as discussed above. The block diagram 200 includes a microprocessor 201 that fetches instructions and accesses data associated with an application program from an area of system memory called application memory 203. Program control and access of data within the application memory 203 is generally managed by operating system software 202 that resides in a protected area of system memory. As discussed above, if an executing application program (e.g., an email program or a file storage program) requires that a cryptographic operation be performed, the executing application program must accomplish the cryptographic operation by directing the microprocessor 201 to execute a significant number of instructions. These instructions may be subroutines that are part of the executing application program itself, they may be plug-in applications that are linked to the execution application program, or they may be services that are provided by the operating system 202. Regardless of their association, one skilled in the art will appreciate that the instructions will reside in some designated or allocated area of memory. For purposes of discussion, these areas of memory are shown within the application memory 203 and comprise a cryptographic key generation application 204 that typically generates or accepts a cryptographic key and expands the key into a key schedule 205 for use in cryptographic round operations. For a multi-block encryption operation, a block encryption application 206 is invoked. The encryption application 206 executes instructions that access blocks of plaintext 210, the key schedule 205, cryptographic parameters 209 that further specify particulars of the encryption operation such as mode, location of the key schedule, etc. If required by specified mode, an initialization vector 208 is also accessed by the encryption application 206. The encryption application 206 executes the instructions therein to generate corresponding blocks of ciphertext 211. Similarly, a block decryption application 207 is invoked for performing block decryption operations. The decryption application 207 executes instructions that access blocks of ciphertext 211, the key schedule 205, cryptographic parameters 209 that further specify particulars of the block decryption operation and, if mode requires, an initialization vector 208 is also accessed. The decryption application 207 executes the instructions therein to generate corresponding blocks of plaintext 210.

It is noteworthy that a significant number of instructions must be executed in order to generate cryptographic keys and to encrypt or decrypt blocks of text. The aforementioned FIPS specifications contain many examples of pseudo code enabling the approximate number of instructions that are required to be estimated, therefore, one skilled in the art will appreciate that hundreds of instructions are required to accomplish a simple block encryption operation. And each of these instructions must be executed by the microprocessor 201 in order to accomplish the requested cryptographic operation. Furthermore, the execution of instructions to perform a cryptographic operation is generally seen as superfluous to the primary purposes (e.g., file management, instant messaging, email, remote file access, credit card transaction) of a currently executing application program. Consequently, a user of the currently executing application program senses that the currently executing application is performing inefficiently. In the case of stand-alone or plug-in encryption and decryption applications 206, 207, invocation and management of these applications 206, 207 must also be subject to the other demands of the operating system 202 such as supporting interrupts, exceptions, and like events that further exacerbate the problem. Moreover, for every concurrent cryptographic operation that is required on a computer system, a separate instance of the applications 204, 206, 207 must be allocated in memory 203. And, as noted above, it is anticipated that the number of concurrent cryptographic operations required to be performed by a microprocessor 201 will continue to increase with time.

The present inventors have noted the problems and limitations of current computer system cryptographic techniques and furthermore recognize a need to provide apparatus and methods for performing cryptographic operations in a microprocessor which do not exhibit disadvantageous program delays to users. Accordingly, the present invention provides a microprocessor apparatus and associated methodology for performing cryptographic operations via a dedicated cryptographic unit therein. The cryptographic unit is activated to perform cryptographic operations via programming of a single cryptographic instruction. The present invention will now be discussed with reference to FIGS. 3-12.

Figure 3:
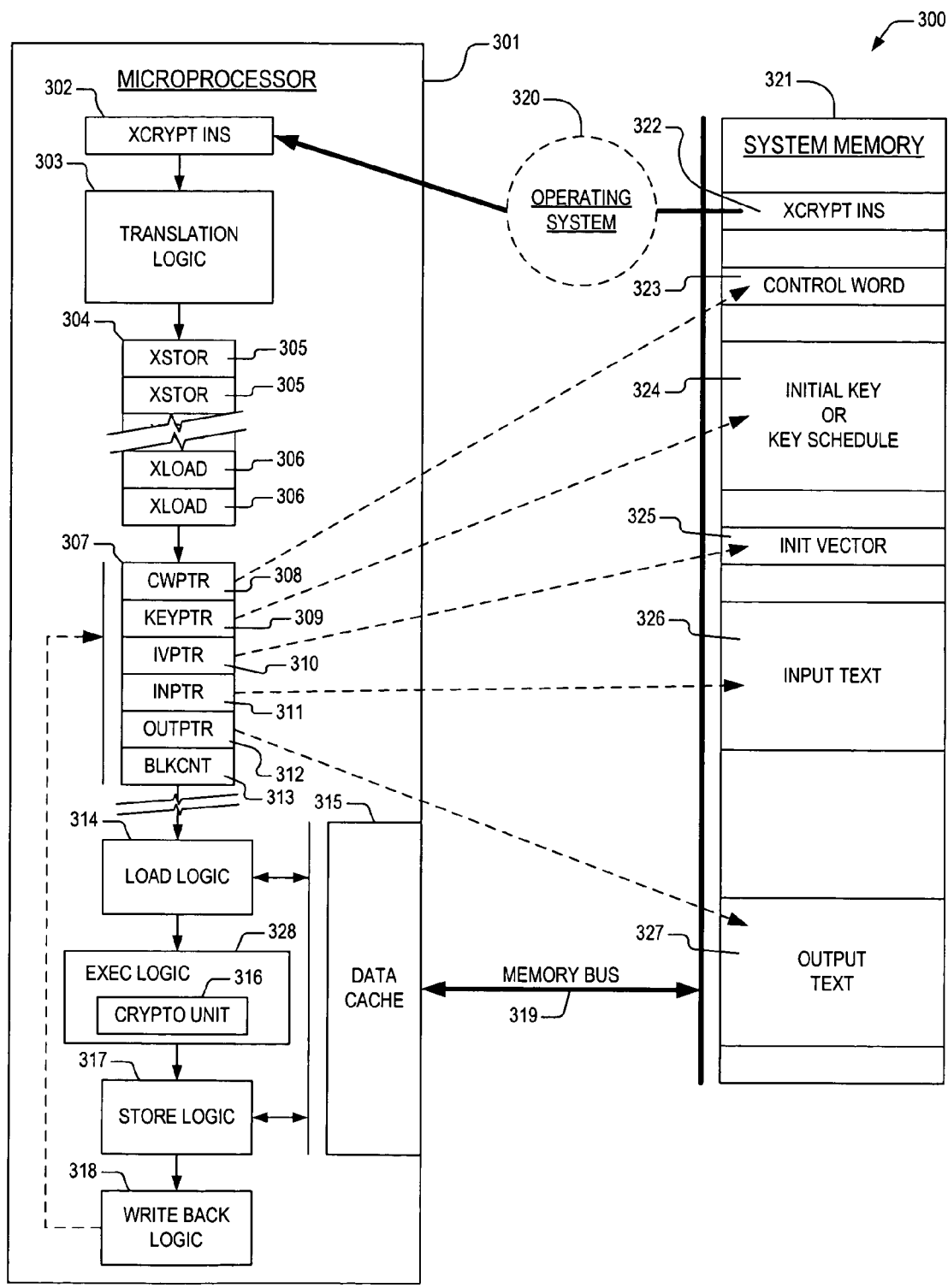
FIG. 3 is a block diagram featuring a microprocessor apparatus according to the present invention for performing cryptographic operations.

Referring to FIG. 3, a block diagram 300 is provided featuring a microprocessor apparatus according to the present invention for performing cryptographic operations. The block diagram 300 depicts a microprocessor 301 that is coupled to a system memory 321 via a memory bus 319. The microprocessor 301 includes translation logic 303 that receives instructions from an instruction register 302. The translation logic 303 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 303 may be shared with other circuits, microcode, etc., that are employed to perform other functions within the microprocessor 301. According to the scope of the present application, microcode is a term employed to refer to one or more micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor. The translation logic 303 is coupled to a micro instruction queue 304. The micro instruction queue 304 has a plurality of micro instruction entries 305, 306. Micro instructions are provided from the micro instruction queue 304 to register stage logic that includes a register file 307. The register file 307 has a plurality of registers 308-313 whose contents are established prior to performing a prescribed cryptographic operation. Registers 308-312 point to corresponding locations 323-327 in memory 321 that contain data which is required to perform the prescribed cryptographic operation. The register stage is coupled to load logic 314, which interfaces to a data cache 315 for retrieval of data for performance of the prescribed cryptographic operation. The data cache 315 is coupled to the memory 321 via the memory bus 319. Execution logic 328 is coupled to the load logic 314 and executes the operations prescribed by micro instructions as passed down from previous stages. The execution logic 328 comprises logic, circuits, devices, or microcode (i.e., micro instructions or native instructions), or a combination of logic, circuits, devices, or microcode, or equivalent elements that are employed to perform operations as prescribed by instructions provided thereto. The elements employed to perform the operations within the execution logic 328 may be shared with other circuits, microcode, etc., that are employed to perform other functions within the microprocessor 301. The execution logic 328 includes a cryptography unit 316. The cryptography unit 316 receives data required to perform the prescribed cryptographic operation from the load logic 314. Micro instructions direct the cryptography unit 316 to perform the prescribed cryptographic operation on a plurality of blocks of input text 326 to generate a corresponding plurality of blocks of output text 327. The cryptography unit 316 comprises logic, circuits, devices, or microcode (i.e., micro instructions or native instructions), or a combination of logic, circuits, devices, or microcode, or equivalent elements that are employed to perform cryptographic operations. The elements employed to perform the cryptographic operations within the cryptography unit 316 may be shared with other circuits, microcode, etc., that are employed to perform other functions within the microprocessor 301. In one embodiment, the cryptography unit 316 operates in parallel to other execution units (not shown) within the execution logic 328 such as an integer unit, floating point unit, etc. One embodiment of a "unit" within the scope of the present application comprises logic, circuits, devices, or microcode (i.e., micro instructions or native instructions), or a combination of logic, circuits, devices, or microcode, or equivalent elements that are employed to perform specified functions or specified operations. The elements employed to perform the specified functions or specified operations within a particular unit may be shared with other circuits, microcode, etc., that are employed to perform other functions or operations within the microprocessor 301. For example, in one embodiment, an integer unit comprises logic, circuits, devices, or microcode (i.e., micro instructions or native instructions), or a combination of logic, circuits, devices, or microcode, or equivalent elements that are employed to execute integer instructions. A floating point unit comprises logic, circuits, devices, or microcode (i.e., micro instructions or native instructions), or a combination of logic, circuits, devices, or microcode, or equivalent elements that are employed to execute floating point instructions. The elements employed execute integer instructions within the integer unit may be shared with other circuits, microcode, etc., that are employed to execute floating point instructions within the floating point unit. In one embodiment that is compatible with the x86 architecture, the cryptography unit 316 operates in parallel with an x86 integer unit, an x86 floating point unit, an x86 MMX® unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the cryptography unit operating in parallel with a subset of the aforementioned x86 execution units. The cryptography unit 316 is coupled to store logic 317 and provides the corresponding plurality of blocks of output text 327. The store logic 317 is also coupled to the data cache 315, which routes the output text data 327 to system memory 321 for storage. The store logic 317 is coupled to write back logic 318. The write back logic 318 updates registers 308-313 within the register file 307 as the prescribed cryptographic operation is accomplished. In one embodiment, micro instructions flow through each of the aforementioned logic stages 302, 303, 304, 307, 314, 316-318 in synchronization with a clock signal (not shown) so that operations can be concurrently executed in a manner substantially similar to operations performed on an assembly line.

Within the system memory 321, an application program that requires the prescribed cryptographic operation can direct the microprocessor 301 to perform the operation via a single cryptographic instruction 322, referred to herein for instructive purposes as an XCRYPT instruction 322. In a CISC embodiment, the XCRYPT instruction 322 comprises an instruction that prescribes a cryptographic operation. In a RISC embodiment, the XCRYPT instruction 322 comprises a micro instruction that prescribes a cryptographic operation. In one embodiment, the XCRYPT instruction 322 utilizes a spare or otherwise unused instruction opcode within an existing instruction set architecture. In one x86-compatible embodiment, the XCRYPT instruction 322 is a 4-byte instruction comprising an x86 REP prefix (i.e., 0xF3), followed by unused x86 2-byte opcode (e.g., 0x0FA7), followed a byte detailing a specific block cipher mode to be employed during execution of a prescribed cryptographic operation. In one embodiment, the XCRPYT instruction 322 according to the present invention can be executed at the level of system privileges afforded to application programs and can thus be programmed into a program flow of instructions that are provided to the microprocessor 301 either directly by an application program or under control of an operating system 320. Since there is only one instruction 322 that is required to direct the microprocessor 301 to perform the prescribed cryptographic operation, it is contemplated that accomplishment of the operation is entirely transparent to the operating system 320.

In operation, the operating system 320 invokes an application program to execute on the microprocessor 301. As part of the flow of instructions during execution of the application program, an XCRYPT instruction 322 is provided from memory 321 to the fetch logic 302. Prior to execution of the XCRYPT instruction 322, however, instructions within the program flow direct the microprocessor 301 to initialize the contents of registers 308-312 so that they point to locations 323-327 in memory 321 that contain a cryptographic control word 323, an initial cryptographic key 324 or a key schedule 324, an initialization vector 325 (if required), input text 326 for the operation, and output text 327. It is required to initialize the registers 308-312 prior to executing the XCRYPT instruction 322 because the XCRYPT instruction 322 implicitly references the registers 308-312 along with an additional register 313 that contains a block count, that is the number of blocks of data within the input text area 326 to be encrypted or decrypted. Thus, the translation logic 303 retrieves the XCRYPT instruction from the fetch logic 302 and translates it into a corresponding sequence of micro instructions that directs the microprocessor 301 to perform the prescribed cryptographic operation. A first plurality of micro instructions 305-306 within the corresponding sequence of micro instructions specifically directs the cryptography unit 316 to load data provided from the load logic 314 and to begin execution of a prescribed number of cryptographic rounds to generate a corresponding block of output data and to provide the corresponding block of output data to the store logic 317 for storage in the output text area 327 of memory 321 via the data cache 315. A second plurality of micro instructions (not shown) within the corresponding sequence of micro instructions directs other execution units (not shown) within the microprocessor 301 to perform other operations necessary to accomplish the prescribed cryptographic operation such as management of non-architectural registers (not shown) that contain temporary results and counters, update of input and output pointer registers 311-312, update of the initialization vector pointer register 310 (if required) following encryption/decryption of a block of input text 326, processing of pending interrupts, etc. In one embodiment, registers 308-313 are architectural registers. An architectural register 308-313 is a register that is defined within the instruction set architecture (ISA) for the particular microprocessor that is implemented.

In one embodiment, the cryptography unit 316 is divided into a plurality of stages thus allowing for pipelining of successive input text blocks 326.

The block diagram 300 of FIG. 3 is provided to teach the necessary elements of the present invention and thus, much of the logic within a present day microprocessor 301 has been omitted from the block diagram 300 for clarity purposes. One skilled in the art will appreciate, however, that a present day microprocessor 301 comprises many stages and logic elements according to specific implementation, some of which have been aggregated herein for clarity purposes. For instance, the load logic 314 could embody an address generation stage followed by a cache interface stage, following by a cache line alignment stage. What is important to note, however, is that a complete cryptographic operation on a plurality of blocks of input text 326 is directed according to the present invention via a single instruction 322 whose operation is otherwise transparent to considerations of the operating system 320 and whose execution is accomplished via a dedicated cryptography unit 316 that operates in parallel with and in concert with other execution units within the microprocessor 301. The present inventors contemplate provision of alternative embodiments of the cryptography unit 316 in embodiment configurations that are analogous to provision of dedicated floating point unit hardware within a microprocessor in former years. Operation of the cryptography unit 316 and associated XCRPYT instruction 322 is entirely compatible with the concurrent operation of legacy operating systems 320 and applications, as will be described in more detail below.

Figures 4, 5:
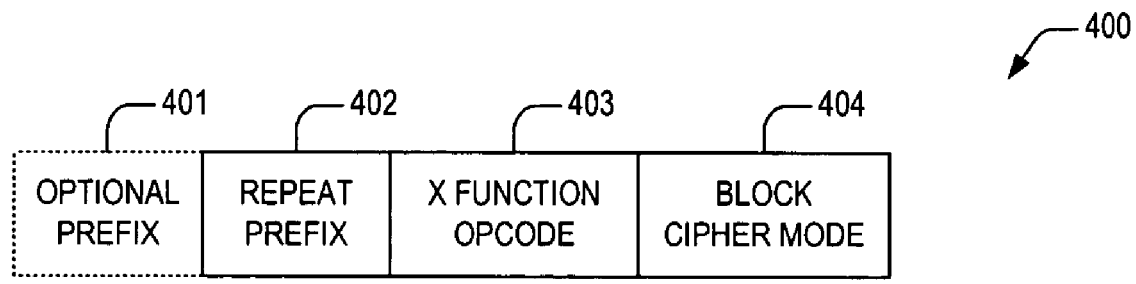
FIG. 4 is a block diagram showing one embodiment of an atomic cryptographic instruction according to the present invention.
FIG. 5 is a table illustrating exemplary block cipher mode field values according to the atomic cryptographic instruction of FIG. 4.

Now referring to FIG. 4, a block diagram is provided showing one embodiment of an atomic cryptographic instruction 400 according to the present invention. The cryptographic instruction 400 includes an optional prefix field 401, which is followed by a repeat prefix field 402, which is followed by an opcode field 403, which is followed by a block cipher mode field 404. In one embodiment, contents of the fields 401-404 comport with the x86 instruction set architecture. Alternative embodiments contemplate compatibility with other instruction set architectures.

Operationally, the optional prefix 401 is employed in many instruction set architectures to enable or disable certain processing features of a host microprocessor such as directing 16-bit or 32-bit operations, directing processing or access to specific memory segments, etc. The repeat prefix 402 indicates that the cryptographic operation prescribed by the cryptographic instruction 400 is to be accomplished on a plurality of blocks of input data (i.e., plaintext or ciphertext). The repeat prefix 402 also implicitly directs a comporting microprocessor to employ the contents of a plurality of architectural registers therein as pointers to locations in system memory that contain cryptographic data and parameters needed to accomplish the specified cryptographic operation. As noted above, in an x86-compatible embodiment, the value of the repeat prefix 402 is 0xF3. And, according to x86 architectural protocol, the cryptographic instruction is very similar in form to an x86 repeat string instruction such as REP.MOVS. For example, when executed by an x86-compatible microprocessor embodiment of the present invention, the repeat prefix implicitly references a block count variable that is stored in architectural register ECX, a source address pointer (pointing to the input data for the cryptographic operation) that is stored in register ESI, and a destination address pointer (pointing to the output data area in memory) that is stored in register EDI. In an x86-compatible embodiment, the present invention further extends the conventional repeat-string instruction concept to further reference a control word pointer that is stored in register EDX, a cryptographic key pointer that is stored in register EBX, and a pointer to an initialization vector (if required by prescribed cipher mode) that is stored in register EAX.

The opcode field 403 prescribes that the microprocessor accomplish a cryptographic operation as further specified within a control word stored in memory that is implicitly referenced via the control word pointer. The present invention contemplates preferred choice of the opcode value 403 as one of the spare or unused opcode values within an existing instruction set architecture so as to preserve compatibility within a conforming microprocessor with legacy operating system and application software. For example, as noted above, an x86-compatible embodiment of the opcode field 403 employs value 0x0FA7 to direct execution of the specified cryptographic operation. The block cipher mode field 404 prescribes the particular block cipher mode to be employed during the specified cryptographic operation, as will now be discussed with reference to FIG. 5.

FIG. 5 is a table 500 illustrating exemplary block cipher mode field values according to the atomic cryptographic instruction of FIG. 4. Value 0xC8 prescribes that the cryptographic operation be accomplished using electronic code book (ECB) mode. Value 0xD0 prescribes that the cryptographic operation be accomplished using cipher block chaining (CBC) mode. Value 0xE0 prescribes that the cryptographic operation be accomplished using cipher feedback (CFB) mode. And value 0xE8 prescribes that the cryptographic operation be accomplished using output feedback (OFB) mode. All other values of the block cipher mode field 404 are reserved. These modes are described in the aforementioned FIPS documents.

Figure 6:
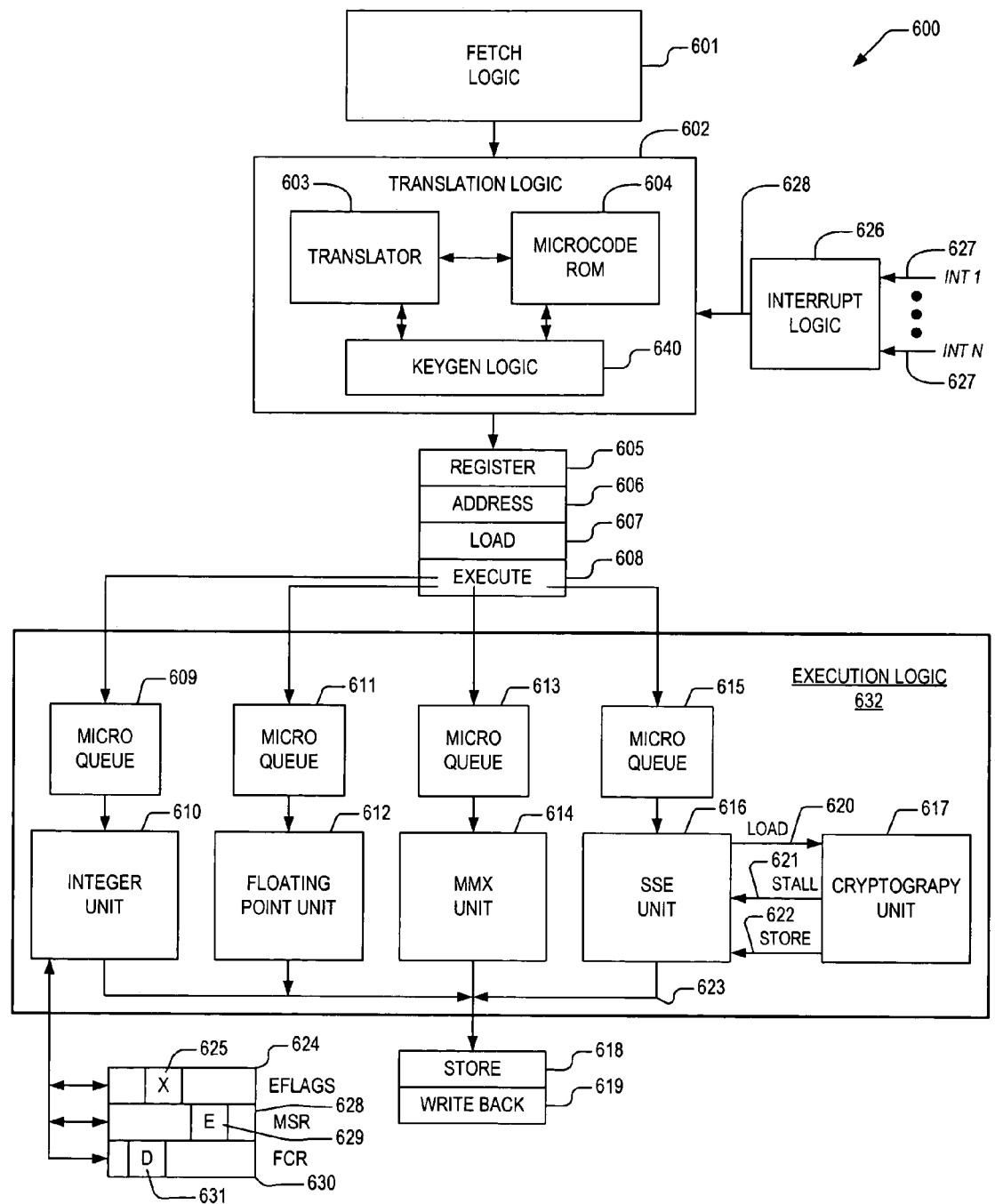
FIG. 6 is a block diagram detailing a cryptography unit within an x86-compatible microprocessor according to the present invention.

Now turning to FIG. 6, a block diagram is presented detailing a cryptography unit 617 within an x86-compatible microprocessor 600 according to the present invention. The microprocessor 600 includes fetch logic 601 that fetches instructions from memory (not shown) for execution. The fetch logic 601 is coupled to translation logic 602. The translation logic 602 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 602 may be shared with other circuits, microcode, etc., that are employed to perform other functions within the microprocessor 600. The translation logic 602 includes a translator 603 that is coupled to a microcode ROM 604. Interrupt logic 626 couples to the translation logic 602 via bus 628. A plurality of software and hardware interrupt signals 627 are processed by the interrupt logic 626 which indicates pending interrupts to the translation logic 628. The translation logic 602 is coupled to successive stages of the microprocessor 600 including a register stage 605, address stage 606, load stage 607, execute stage 608, store stage 618, and write back stage 619. Each of the successive stages include logic to accomplish particular functions related to the execution of instructions that are provided by the fetch logic 601 as has been previously discussed with reference like-named elements in the microprocessor of FIG. 3. The exemplary x86-compatible embodiment 600 depicted in FIG. 6 features execution logic 632 within the execute stage 608 that includes parallel execution units 610, 612, 614, 616, 617. An integer unit 610 receives integer micro instructions for execution from micro instruction queue 609. A floating point unit 612 receives floating point micro instructions for execution from micro instruction queue 611. An MMX® unit 614 receives MMX micro instructions for execution from micro instruction queue 613. An SSE® unit 616 receives SSE micro instructions for execution from micro instruction queue 615. In the exemplary x86 embodiment shown, a cryptography unit 617 is coupled to the SSE unit 616 via a load bus 620, a stall signal 621, and a store bus 622. The cryptography unit 617 shares the SSE unit's micro instruction queue 615. An alternative embodiment contemplates stand-alone parallel operation of the cryptography unit 617 in a manner like that of units 610, 612, and 614. The integer unit 610 is coupled an x86 EFLAGS register 624. The EFLAGS register includes an X bit 625 whose state is set to indicate whether or not cryptographic operations are currently in process. In one embodiment the X bit 625 is bit 30 of an x86 ELFAGS register 624. In addition, the integer unit 610 access a machine specific register 628 to evaluate the state of an E bit 629. The state of the E bit 629 indicates whether or not the cryptography unit 617 is present within the microprocessor 600. The integer unit 610 also accesses a D bit 631 in a feature control register 630 to enable or disable the cryptography unit 617. As with the microprocessor embodiment 301 of FIG. 3, the microprocessor 600 of FIG. 6 features elements essential to teach the present invention in the context of an x86-compatible embodiment and for clarity aggregates or omits other elements of the microprocessor. One skilled in the art will appreciate that other elements are required to complete the interface such as a data cache (not shown), bus interface unit (not shown), clock generation and distribution logic (not shown), etc.

In operation, instructions are fetched from memory (not shown) by the fetch logic 601 and are provided in synchronization with a clock signal (not shown) to the translation logic 602. The translation logic 602 translates each instruction into a corresponding sequence of micro instructions that are sequentially provided in synchronization with the clock signal to subsequent stages 605-608, 618, 619 of the microprocessor 600. Each micro instruction within a sequence of micro instructions directs execution of a sub-operation that is required to accomplish an overall operation that is prescribed by a corresponding instruction such as generation of an address by the address stage 606, addition of two operands within the integer unit 610 which have been retrieved from prescribed registers (not shown) within the register stage 605, storage of a result generated by one of the execution units 610, 612, 614, 616, 617 in memory by the store logic 618, etc. Depending upon the instruction that is being translated, the translation logic 602 will employ the translator 603 to directly generate the sequence of micro instructions, or it will fetch the sequence from the microcode ROM 604, or it will employ the translator 603 to directly generate a portion of the sequence and fetch the remaining portion of the sequence from the microcode ROM 604. The micro instructions proceed sequentially through the successive stages 605-608, 618, 619 of the microprocessor 600 in synchronization with the clock. As micro instructions reach the execute stage 608, they are routed by the execution logic 632 along with their operands (retrieved from registers within the register stage 605, or generated by logic within the address stage 606, or retrieved from a data cache by the load logic 608) to a designated execution unit 610, 612, 614, 616, 617 by placing the micro instructions in a corresponding micro instruction queue 609, 611, 613, 615. The execution units 610, 612, 614, 616, 617 execute the micro instructions and provide results to the store stage 618. In one embodiment, the micro instructions include fields indicating whether or not they can be executed in parallel with other operations.

Responsive to fetching an XCRYPT instruction as described above, the translation logic 602 generates associated micro instructions that direct logic within subsequent stages 605-608, 618, 619 of the microprocessor 600 to perform the prescribed cryptographic operation. Accordingly, a first plurality of the associated micro instructions are routed directly to the cryptography unit 617 and direct the unit 617 to load data provided over the load bus 620, or to load a block of input data and begin execution of a prescribed number of cryptographic rounds to produce a block of output data, or to provide a produced block of output data over the store bus 622 for storage in memory by the store logic 618. A second plurality of the associated micro instructions are routed to other execution units 610, 612, 614, 616 to perform other sub-operations that are necessary to accomplish the prescribed cryptographic operation such as testing of the E bit 629, enabling the D bit 631, setting the X bit 625 to indicate that a cryptographic operation is in process, updating registers (e.g., count register, input text pointer register, output text pointer register) within the register stage 605, processing of interrupts 627 indicated by the interrupt logic 626, etc. The associated micro instructions are ordered to provide for optimum performance of specified cryptographic operations on multiple blocks of input data by interlacing integer unit micro instructions within sequences of cryptography unit micro instructions so that integer operations can be accomplished in parallel with cryptography unit operations. Micro instructions are included in the associated micro instructions to allow for and recover from pending interrupts 627. Because all of the pointers to cryptographic parameters and data are provided within x86 architectural registers, their states are saved when interrupts are processed and the states are restored upon return from interrupts. Upon return from an interrupt, micro instructions test the state of the X bit 625 to determine if a cryptographic operation was in progress. If so, the operation is repeated on the particular block of input data that was being processed when the interrupt occurred. The associated micro instructions are ordered to allow for the pointer registers and intermediate results of a sequence of block cryptographic operations on a sequence of input text blocks to be updated prior to processing interrupts 627.

Now referring to FIG. 7, a diagram is presented illustrating fields within an exemplary micro instruction 700 for directing cryptographic sub-operations within the microprocessor of FIG. 6. The micro instruction 700 includes a micro opcode field 701, a data register field 702, and a register field 703. The micro opcode field 701 specifies a particular sub-operation to be performed and designates logic within one or more stages of the microprocessor 600 to perform the sub-operation. Specific values of the micro opcode field 701 designate that the micro instruction is directed for execution by a cryptography unit according to the present invention. In one embodiment, there are two specific values. A first value (XLOAD) designates that data is to be retrieved from a memory location whose address is specified by contents of an architectural register denoted by contents of the data register field 702. The data is to be loaded into a register within the cryptography unit that is specified by contents of the register field 703. The retrieved data (e.g., cryptographic key data, control word, input text data, initialization vector) is provided to the cryptography unit. A second value (XSTOR) of the micro opcode field 701 designates that data generated by the cryptography unit is to be stored in a memory location whose address is specified by contents of an architectural register denoted by contents of the data register field 702. In a multi-stage embodiment of the cryptography unit, contents of the register field 703 prescribe one of a plurality of output data blocks for storage in memory. The output data block is provided by the cryptography unit in the data field 704 for access by store logic. More specific details concerning XLOAD and XSTOR micro instructions for execution by a cryptography unit according to the present invention will now be discussed with reference to FIGS. 8 and 9.

Turning to FIG. 8, a table 800 is presented depicting values of the register field 703 for an XLOAD micro instruction according to the format 700 of FIG. 7. As was previously discussed, a sequence of micro instructions is generated in response to translation of an XCRPYT instruction. The sequence of micro instructions comprises a first plurality of micro instructions that are directed for execution by the cryptography unit and a second plurality of micro instructions that are executed by one or more of the parallel functional units within the microprocessor other that the cryptography unit. The second plurality of micro instructions direct sub-operations such as updating of counters, temporary registers, architectural registers, testing and setting of status bits in machine specific registers, and so on. The first plurality of instructions provide key data, cryptographic parameters, and input data to the cryptography unit and direct the cryptography unit to generate key schedules (or to load key schedules that have been retrieved from memory), to load and encrypt (or decrypt) input text data, and to store output text data. An XLOAD micro instruction is provided to the cryptography unit to load control word data, to load a cryptographic key or key schedule, to load initialization vector data, to load input text data, and to load input text data and direct the cryptography unit to begin a prescribed cryptographic operation. Value 0b010 in the register field 703 of an XLOAD micro instruction directs the cryptography unit to load a control word into its internal control word register. As this micro instruction proceeds down the pipeline, an architectural control word pointer register within the register stage is accessed to obtain the address in memory where the control word is stored. Address logic translates the address into a physical address for a memory access. The load logic fetches the control word from cache and places the control word in the data field 704, which is then passed to the cryptography unit. Likewise, register field value 0b100 directs the cryptography unit to load input text data provided in the data field 704 and, following the load, to start the prescribed cryptographic operation. Like the control word, the input data is accessed via a pointer stored in an architectural register. Value 0b101 directs that input data provided in the data field 704 be loaded into internal register 1 IN-1. Data loaded into IN-1 register can be either input text data (when pipelining) or an initialization vector. Values 0b110 and 0b111 direct the cryptography unit to load lower and upper bits, respectively, of a cryptographic key or one of the keys in a user-generated key schedule. According to the present application, a user is defined as that which performs a specified function or specified operation. The user can embody an application program, an operating system, a machine, or a person. Hence, the user-generated key schedule, in one embodiment, is generated by an application program. In an alternative embodiment, the user-generated key schedule is generated by a person.

In one embodiment, register field values 0b100 and 0b101 contemplate a cryptography unit that has two stages, whereby successive blocks of input text data can be pipelined. Hence, to pipeline two successive blocks of input data, a first XLOAD micro instruction is executed that provides a first block of input text data to IN-1 followed by execution of a second XLOAD micro instruction that provides a second block of input text data to IN-0 and that also directs the cryptography unit to begin performing the prescribed cryptographic operation.

If a user-generated key schedule is employed to perform the cryptographic operation, then a number of XLOAD micro instructions that correspond to the number of keys within the user-generated key schedule are routed to the cryptography unit that direct the unit to load each round key within the key schedule.

All other values of the register field 703 in an XLOAD micro instruction are reserved.

Referring to FIG. 9, a table 900 is presented showing values of the register field 703 for an XSTOR micro instruction according to the format 700 of FIG. 7. An XSTOR micro instruction is issued to the cryptography unit to direct it to provide a generated (i.e., encrypted or decrypted) output text block to store logic for storage in memory at the address provided in the address field 702. Accordingly, translation logic according to the present invention issues an XSTOR micro instruction for a particular output text block following issuance of an XLOAD micro instruction for its corresponding input text block. Value 0b100 of the register field 703 directs the cryptography unit to provide the output text block associated with its internal output-0 OUT-0 register to store logic for storage. Contents of OUT-0 are associated with the input text block provided to IN-0. Likewise, contents of internal output-1 register, referenced by register field value 0b101, are associated with the input text data provided to IN-1. Accordingly, following loading of keys and control word data, a plurality of input text blocks can be pipelined through the cryptography unit by issuing cryptographic micro instructions in the order XLOAD.IN-1, XLOAD.IN-0 (XLOAD.IN-0 directs the cryptography unit to start the cryptographic operation as well), XSTOR.OUT-1, XSTOR.OUT-0, XLOAD.IN-1, XLOAD.IN-0 (starts the operation for the next two input text blocks), and so on.

Now turning to FIG. 10, a diagram is provided highlighting an exemplary control word format 1000 for prescribing cryptographic parameters of a cryptographic operation according to the present invention. The control word 1000 is programmed into memory by a user and its pointer is provided to an architectural register within a conforming microprocessor prior to performing cryptographic operations. Accordingly, as part of a sequence of micro instructions corresponding to a provided XCRYPT instruction, an XLOAD micro instruction is issued directing the microprocessor to read the architectural register containing the pointer, to convert the pointer into a physical memory address, to retrieve the control word 1000 from memory (cache), and to load the control word 1000 into the cryptography unit's internal control word register. The control word 1000 includes a reserved RSVD field 1001, a data block size field 1002, a key size KSIZE field 1003, an encryption/decryption E/D field 1004, an intermediate result IRSLT field 1005, a key generation KGEN field 1006, an algorithm ALG field 1007, and a round count RCNT field 1008.

All values for the reserved field 1001 are reserved. Contents of the DSIZE field 1002 prescribe the input and output text block size to be employed when performing encryption and decryption. In one embodiment, the DSIZE field 1002 prescribes either 128-bit blocks, 192-bit blocks, or 256-bit blocks. Contents of the KSIZE field 1003 prescribe the size of a cryptographic key that is to be employed to accomplish encryption or decryption. In one embodiment, the KSIZE field 1003 prescribes either a 128-bit key, a 192-bit key, or a 256-bit key. The E/D field 1004 specifies whether the cryptographic operation is to be an encryption operation or a decryption operation. The KGEN field 1006 indicates if a user-generated key schedule is provided in memory or if a single cryptographic key is provided in memory. If a single cryptographic key is provided, then micro instructions are issued to the cryptography unit along with the cryptographic key directing the unit to expand the key into a key schedule according to the cryptographic algorithm that is specified by contents of the ALG field 1007. In one embodiment, specific values of the ALG field 1007 specifies the DES algorithm, the Triple-DES algorithm, or the AES algorithm as has heretofore been discussed. Alternative embodiments contemplate other cryptographic algorithms such as the Rijndael Cipher, the Twofish Cipher, etc. Contents of the RCNT field 1008 prescribe the number of cryptographic rounds that are to be accomplished on each block of input text according to the specified algorithm. Although the standards for the above-noted algorithms prescribed a fixed number of cryptographic rounds per input text block, provision of the RCNT field 1008 allows a programmer to vary the number of rounds from that specified by the standards. In one embodiment, the programmer can specify from 0 to 15 rounds per block. Finally, contents of the IRSLT field 1005 specify whether encryption/decryption of an input text block is to be performed for the number of rounds specified in RCNT 1008 according to the standard for the cryptographic algorithm specified in ALG 1007 or whether the encryption/decryption is to be performed for the number of rounds specified in RCNT 1008 where the final round performed represents an intermediate result rather than a final result according to the algorithm specified in ALG 1007. One skilled in the art will appreciate that many cryptographic algorithms perform the same sub-operations during each round, except for those performed in the final round. Hence, programming the IRSLT field 1005 to provide intermediate results rather than final results allows a programmer to verify intermediate steps of the implemented algorithm. For example, incremental intermediate results to verify algorithm performance can be obtained by, say, performing one round of encryption on a text block, then performing two rounds on the same text block, then three round, and so on. The capability to provide programmable rounds and intermediate results enables users to verify cryptographic performance, to troubleshoot, and to research the utility of varying key structures and round counts.

Turning now to FIG. 11, a table 1100 is presented illustrating exemplary values of the DSIZE field 1002 for the control word 1000 of FIG. 10. A "000" value of the DSIZE field 1002 directs a computing device according to the present invention to perform a prescribed cryptographic operation using a 128-bit block size for both input and output text blocks, where the blocks are provided in memory and are pointed to by contents of an input pointer register and output pointer register, respectively. A "001" value of the DSIZE field 1002 directs the computing device to perform the prescribed cryptographic operation using a 192-bit block size for both input and output text blocks. A "010" value of the DSIZE field 1002 directs the computing device to perform the prescribed cryptographic operation using a 256-bit block size for both input and output text blocks. All other values of the DSIZE field are reserved.

Now referring to FIG. 12, a block diagram is presented featuring details of an exemplary cryptography unit 1200 according to the present invention. The cryptography unit 1200 includes a micro opcode register 1203 that receives cryptographic micro instructions (i.e., XLOAD and XSTOR micro instructions) via a micro instruction bus 1214. The cryptography unit 1200 also has a control word register 1204, an input-0 register 1205, and input-1 register 1206, a key-0 register 1207, and a key-1 register 1208. Data is provided to registers 1204-1208 via a load bus 1211 as prescribed by contents of an XLOAD micro instruction within the micro instruction register 1203. The cryptography unit 1200 also includes block cipher logic 1201 that is coupled to all of the registers 1203-1208 and that is also coupled to cryptographic key RAM 1202. The block cipher logic 1201 also provides a stall signal 1213 and also provides block results to an output-0 register 1209 and an output-1 register 1210. The output registers 1209-1210 route their contents to successive stages in a conforming microprocessor via a store bus 1212. In one embodiment, the micro instruction register 1203 is 32 bits in size; registers 1204, 1207, and 1208 are 128-bits in size; and registers 1205-1206 and 1209-1210 are 256-bits in size.

Operationally, cryptographic micro instructions are provided sequentially to the micro instruction register 1203 along with data that is designated for the control word register 1204, or one of the input registers 1205-1206, or one of the key registers 1207-1208. In the embodiment discussed with reference to FIGS. 8 and 9, a control word is loaded via an XLOAD micro instruction to the control word register 1204. Then the cryptographic key or key schedule is loaded via successive XLOAD micro instructions. If a 128-bit cryptographic key is to be loaded, then an XLOAD micro instruction is provided designating register KEY-0 1207. If a cryptographic key greater than 128 bits is to be loaded, then an XLOAD micro instruction is provided designating register KEY-0 1207 is provided along with an XLOAD micro instruction designating register KEY-1 1208. If a user-generated key schedule is to be loaded, then successive XLOAD micro instructions designating register KEY-0 1207 are provided. Each of the keys from the key schedule that are loaded are placed, in order, in the key RAM 1202 for use during their corresponding cryptographic round. Following this, input text data (if an initialization vector is not required) is loaded to IN-1 register 1206. If an initialization vector is required, then it is loaded into IN-1 register 1206 via an XLOAD micro instruction. An XLOAD micro instruction to IN-0 register 1205 directs the cryptography unit to load input text data to IN-0 register 1205 and to begin performing cryptographic rounds on input text data in register IN-0 1205 using the initialization vector in IN-1 or in both input registers 1205-1206 (if input data is being pipelined) according to the parameters provided via contents of the control word register 1204. Upon receipt of an XLOAD micro instruction designating IN-0 1205, the block cipher logic 1201 starts performing the cryptographic operation prescribed by contents of the control word. If expansion of a single cryptographic key is required, then the block cipher logic 1201 generates each of the keys in the key schedule and stores them in the key RAM 1202. Regardless of whether the block cipher logic 1201 generates a key schedule or whether the key schedule is loaded from memory, the key for the first round is cached within the block cipher logic 1201 so that the first block cryptographic round can proceed without having to access the key RAM 1202. Once initiated, the block cipher logic 1201 continues executing the prescribed cryptographic operation on one or more blocks of input text until the operation is completed, successively fetching round keys from the key RAM 1202 as required by the cryptographic algorithm which is employed. The cryptography unit 1200 performs a specified block cryptographic operation on designated blocks of input text. Successive blocks of input text are encrypted or decrypted through the execution of corresponding successive XLOAD and XSTOR micro instructions. When an XSTOR micro instruction is executed, if the prescribed output data (i.e., OUT-0 or OUT-1) has not yet completed generation, then the block cipher logic 1201 asserts the stall signal 1213. Once the output data has been generated and placed into a corresponding output register 1209-1210, then the contents of that register 1209-1210 are transferred to the store bus 1212.

Figure 13:
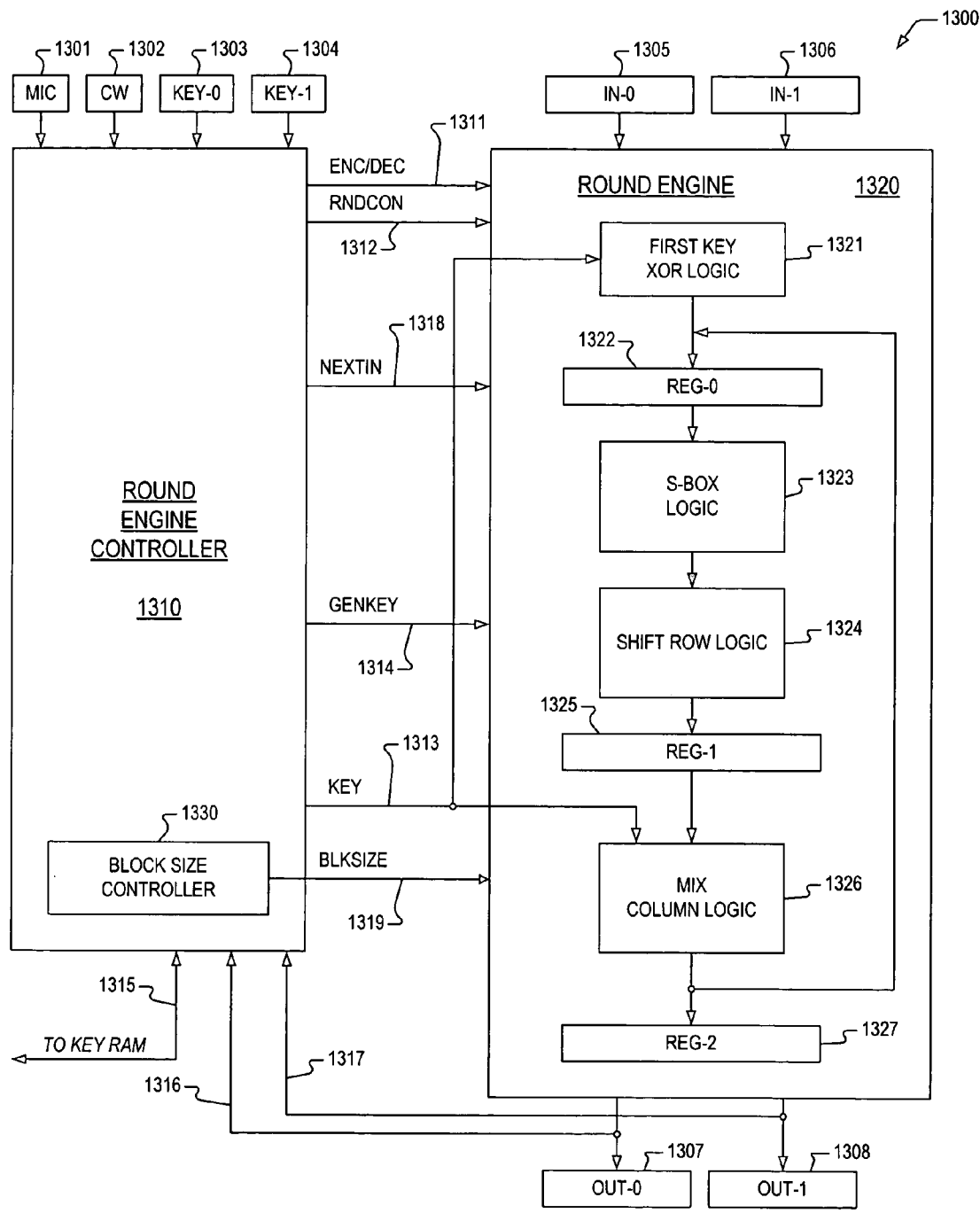
FIG. 13 is a block diagram illustrating an embodiment of block cipher logic according to the present invention for performing cryptographic operations in accordance with the Advanced Encryption Standard (AES) algorithm.

Now turning to FIG. 13, a block diagram is provided illustrating an exemplary embodiment of block cipher logic 1300 according to the present invention for performing cryptographic operations in accordance with the Advanced Encryption Standard (AES). The block cipher logic 1300 includes a round engine 1320 that is coupled to a round engine controller 1310 via buses 1311-1314 and buses 1316-1318. The round engine controller 1310 includes a block size controller 1330 and accesses a micro instruction register 1301, control word register 1302, KEY-0 register 1303, and KEY-1 register 1304 to access key data, micro instructions, and parameters of the directed cryptographic operation. Contents of input registers 1305-1306 are provided to the round engine 1320 and the round engine 1320 provides corresponding output text to output registers 1307-1308. The output registers 1307-1308 are also coupled to the round engine controller 1310 via buses 1316-1317 to enable the round engine controller access to the results of each successive cryptographic round, which is provided to the round engine 1320 for a next cryptographic round via bus NEXTIN 1318. Cryptographic keys from key RAM (not shown) are accessed via bus 1315. Signal ENC/DEC 1311 directs the round engine to employ sub-operations for performing either encryption (e.g., S-Box) or decryption (e.g., Inverse S-Box). Contents of bus RNDCON 1312 direct the round engine 1320 to perform either a first AES round, an intermediate AES round, or a final AES round. Responsive to contents of a kgen field within a control word that directs that a cryptographic key be automatically expanded, the key schedule controller 1330 asserts signal GENKEY 1314 to direct the round engine 1320 to generate a key schedule according to the key provided via bus 1313. Key bus 1313 is also employed to provide each round key to the round engine 1320 when its corresponding round is executed. Responsive to contents of a DSIZE field within a control word provided to the round engine controller 1310 via the control word register 1302, the block size controller 1330 sets the value of bus BLKSIZE 1319 to indicate the size of input and output text blocks to be employed during encryption and decryption operations. In one embodiment, the value of bus BLKSIZE 1319 indicates 128-bit blocks, 192-bit blocks, or 256-bit blocks.

The round engine 1320 includes first key XOR logic 1321 that is coupled to a first register REG-0 1322. The first register 1322 is coupled to S-Box logic 1323, which is coupled to Shift Row logic 1324. The Shift Row logic 1324 is coupled to a second register REG-1 1325. The second register 1325 is coupled to Mix Column logic 1326, which is coupled to a third register REG-2 1327. The first key logic 1321, S-Box logic 1323, Shift Row logic 1324, and Mix Column logic 1326 are configured to perform like-named sub-operations on input text data as is specified in the AES FIPS standard discussed above in accordance with the value of bus BLKSIZE 1319. The Mix Columns logic 1326 is additionally configured to perform AES XOR functions on input data during intermediate rounds as required using round keys provided via the key bus 1313. The first key logic 1321, S-Box logic 1323, Shift Row logic 1324, and Mix Column logic 1326 are also configured to perform their corresponding inverse AES sub-operations during decryption as directed via the state of ENC/DEC 1311. One skilled in the art will appreciate that intermediate round data is fed back to the round engine 1320 according to which particular block encryption mode is prescribed via contents of the control word register 1302. Initialization vector data (if required) is provided to the round engine 1320 via bus NEXTIN 1318.

In the embodiment shown in FIG. 13, the round engine is divided into two stages: a first stage between REG-0 1322 and REG-1 1325 and a second stage between REG-1 1325 and REG-2 1327. Intermediate round data is pipelined between stages in synchronization with a clock signal (not shown). When a cryptographic operation is completed on a block of input data, the associated output data is placed into a corresponding output register 1307-1308. Execution of an XSTOR micro instruction causes contents of a designated output register 1307-1308 to be provided to a store bus (not shown).

Figure 14:
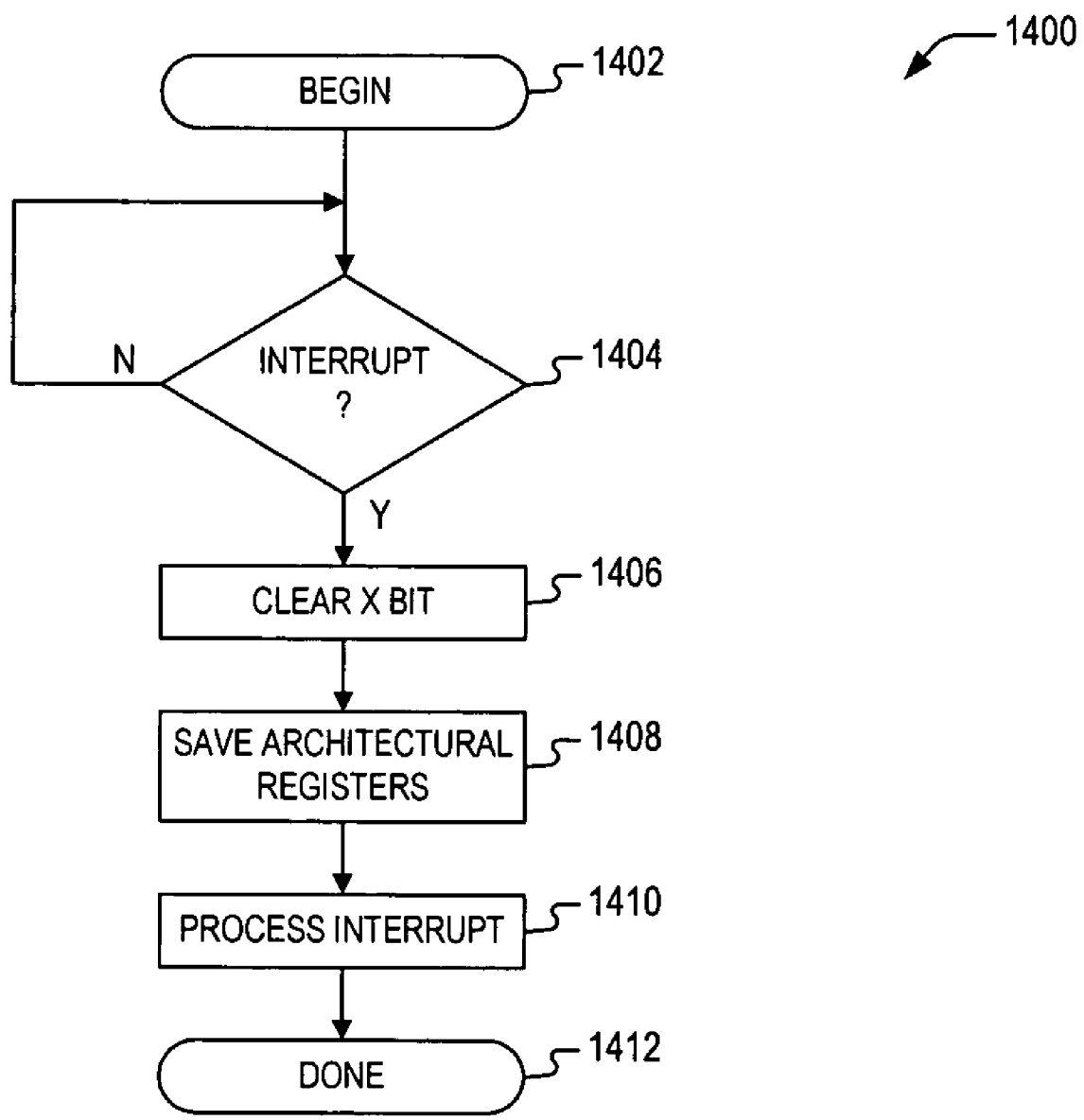
FIG. 14 is a flow chart featuring a method according to the present invention for preserving the state of cryptographic parameters during an interrupting event.

Now turning to FIG. 14, a flow chart is presented featuring a method according to the present invention for preserving the state of cryptographic parameters during an interrupting event. Flow begins at block 1402 when a flow of instructions is executed by a microprocessor according to the present invention. It is not necessary that the flow of instructions include an XCRYPT instruction as is herein described. Flow then proceeds to decision block 1404.

At decision block 1404, an evaluation is made to determine if an interrupting event (e.g., maskable interrupt, non-maskable interrupt, page fault, task switch, etc.) is occurring that requires a change in the flow of instructions over to a flow of instructions ("interrupt handler") to process the interrupting event. If so, then flow proceeds to block 1406. If not, then flow loops on decision block 1404 where instruction execution continues until an interrupting event occurs.

At block 1406, because an interrupting event has occurred, prior to transferring program control to a corresponding interrupt handler, interrupt logic according to the present invention directs that the X bit within a flags register be cleared. Clearing of the X bit ensures that, upon return from the interrupt handler, if a block cryptographic operation was in progress, it will be indicated that one or more interrupting events transpired and that control word data and key data must be reloaded prior to continuing the block cryptographic operation on the block of input data currently pointed to by contents of the input pointer register. Flow then proceeds to block 1408.

At block 1408, all of the architectural registers containing pointers and counters associated with performance of a block cryptographic operation according to the present invention are saved to memory. One skilled in the art will appreciate that the saving of architectural registers is an activity that is typically accomplished in a present data computing device prior to transferring control to interrupt handlers. Consequently, the present invention exploits this aspect of present data architectures to provide for transparency of execution throughout interrupting events. After the registers are saved, flow then proceeds to block 1410.

At block 1410, program flow is transferred to the interrupt handler. Flow then proceeds to block 1412.

At block 1412, the method completes. One skilled in the art will appreciate that the method of FIG. 14 begins again at block 1402 upon return from the interrupt handler.

Figure 15:
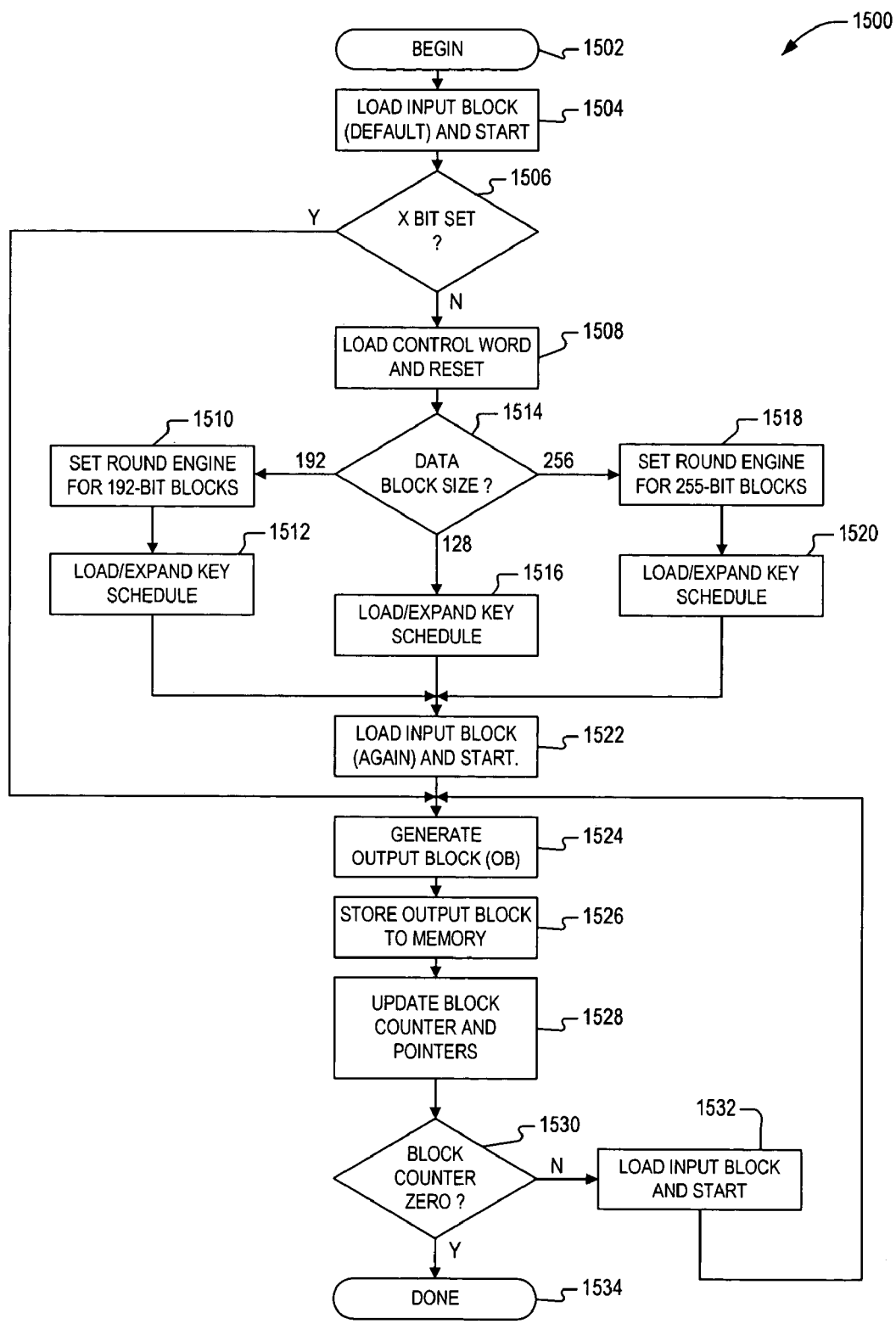
FIG. 15 is a flow chart depicting a method according to the present invention for employing a user-prescribed block size when performing a cryptographic operation on a plurality of input data blocks in the presence of one or more interrupting events.

Now referring to FIG. 15, a flow chart 1500 is provided depicting a method according to the present invention for employing a user-prescribed block size when performing a cryptographic operation on a plurality of input data blocks in the presence of one or more interrupting events. For purposes of clarity, flow for executing the specified cryptographic operations according to block cipher modes that require update and storage of initialization vector equivalents between blocks (e.g., output feedback mode, cipher feedback mode) is omitted, although these other block cipher modes are comprehended by the method according to the present invention.

Flow begins at block 1502, where an XCRPYT instruction according to the present invention that directs a cryptographic operation begins execution. Execution of the XCRYPT instruction can be a first execution or it can be execution following a first execution as a result of interruption of execution by an interrupting event such that program control is transferred back to the XCRYPT instruction after an interrupt handler has executed. Flow then proceeds to block 1504.

At block 1504, a block of data in memory that is pointed to by contents of an input pointer register according to the present invention is loaded from the memory and a prescribed cryptographic operation is started. The block size that is employed to load the block of data is 128 bits in a default embodiment. Consequently, when block sizes other than 128 bits are employed, it is required that instructions be executed to clear the X bit prior to issuing the XCRYPT instruction. In an X86-compatible embodiment that employs bit 30 within an X86 EFLAGS register, the X bit can be cleared by executing a PUSHFD instruction followed by a POPFD instruction. One skilled in the art will appreciate, however, that in alternative embodiments other instructions must be employed to clear the X bit. In one embodiment, the prescribed cryptographic operation is started according to the AES algorithm. Flow then proceeds to decision block 1506.

At decision block 1506, an evaluation is made to determine whether or not an X bit in a flags register is set. If the X bit is set, then it is indicated that the control word and key schedule currently loaded within a cryptography unit according to the present invention are valid. If the X bit is clear, then it is indicated that the control word and key schedule currently loaded within the cryptography unit are not valid. As alluded to above with reference to FIG. 14, the X bit is cleared when an interrupting event occurs. If the X bit is set, then flow proceeds to block 1524. IF the X bit is clear, then flow proceeds to block 1508.

At block 1508, since a cleared X bit has indicated that either an interrupting event has occurred or that a new control word and/or key data are to be loaded, a control word is loaded from memory. In one embodiment, loading the control word stops the cryptography unit from performing the prescribed cryptographic operation noted above with reference to block 1504. Starting a cryptographic operation in block 1504 in this exemplary embodiment allows for optimization of multiple 128-bit block cryptographic operations using ECB mode by presuming that a currently loaded control word and key data are to be employed and that ECB mode performed on 128-bit input blocks is the most commonly employed block cipher mode. Accordingly, the current block of input data is loaded and the cryptographic operation begun prior to checking the state of the X bit in decision block 1506 is reset. Flow then proceeds to decision block 1514.

At decision block 1514, the DSIZE field within the control word retrieved at block 1508 is evaluated to determine the size of input and output text blocks to be employed during performance of the prescribed cryptographic operation. If the value of the DSIZE field prescribes 192-bit blocks, then flow proceeds to block 1510. If the value of the DSIZE field prescribes 128-bit blocks, then flow proceeds to block 1516. If the value of the DSIZE field prescribes 256-bit blocks, then flow proceeds to block 1518.

At block 1510, bus BLKSIZE within block cipher logic according to the present invention is set to direct its round engine to perform cryptographic operations for 192-bit data blocks. Flow then proceeds to block 1512.

At block 1512, the cryptographic key data is loaded from memory. According to the state of fields KGEN and KSIZE within the control word, the key data is either loaded entirely from memory (i.e., a user-generated key schedule) or an initial key is loaded and expanded into a key schedule. Flow then proceeds to block 1522.

At block 1516, because bus BLKSIZE within the block cipher logic defaults to 128-bit data blocks, all that is necessary is to load/expand the cryptographic key data as described above with reference to block 1512. Flow then proceeds to block 1522.

At block 1518, bus BLKSIZE within block cipher logic according to the present invention is set to direct its round engine to perform cryptographic operations for 256-bit data blocks. Flow then proceeds to block 1520.

At block 1520, the cryptographic key data is loaded/expanded as described above with reference to block 1512. Flow then proceeds to block 1522.

At block 1518, the input block referenced in block 1504 is loaded again according to the block size specified by the value of the DSIZE field within the control word and the cryptographic operation is started according to the newly loaded control word and key schedule. Flow then proceeds to block 1524.

At block 1524, an output block corresponding in size to the loaded input block is generated. For encryption, the input block is a plaintext block and the output block is a corresponding ciphertext block. For decryption, the input block is a ciphertext block and the output block is a corresponding plaintext block. Flow then proceeds to block 1526.

At block 1526, the generated output block is stored to memory. Flow then proceeds to block 1528.

At block 1528, the contents of input and output block pointer registers are modified to point to next input and output data blocks according to the value of field DSIZE within the control word. In addition, contents of the block counter register are modified to indicate completion of the cryptographic operation on the current input data block. In the embodiment discussed with reference to FIG. 15, the block counter register is decremented. One skilled in the art will appreciate, however, that alternative embodiments contemplate manipulation and testing of contents of the block count register to allow for pipelined execution of input text blocks as well. Flow then proceeds to decision block 1530.

At decision block 1530, an evaluation is made to determine if an input data block remains to be operated upon. In the embodiment featured herein, for illustrative purposes, the block counter is evaluated to determine if it equals zero. If no block remains to be operated upon, then flow proceeds to block 1534. If a block remains to be operated upon, then flow proceeds to block 1532.

At block 1532, the next block of input data is loaded, as pointed to by contents of the input pointer register. Flow then proceeds to block 1524.

At block 1530, the method completes.

Although the present invention and its objects, features, and advantages have been described in detail, other embodiments are encompassed by the invention as well. For example, the present invention has been discussed at length according to embodiments that are compatible with the x86 architecture. However, the discussions have been provided in such a manner because the x86 architecture is widely comprehended and thus provides a sufficient vehicle to teach the present invention. The present invention nevertheless comprehends embodiments that comport with other instruction set architectures such as PowerPC®, MIPS®, and the like, in addition to entirely new instruction set architectures.

The present invention moreover comprehends execution of cryptographic operations within elements of a computing system other than the microprocessor itself. For example, the cryptographic instruction according to the present invention could easily be applied within an embodiment of a cryptography unit that is not part of the same integrated circuit as a microprocessor that exercises as part of the computer system. It is anticipated that such embodiments of the present invention are in order for incorporation into a chipset surrounding a microprocessor (e.g., north bridge, south bridge) or as a processor dedicated for performing cryptographic operations where the cryptographic instruction is handed off to the processor from a host microprocessor. It is contemplated that the present invention applies to embedded controllers, industrial controllers, signal processors, array processors, and any like devices that are employed to process data. The present invention also comprehends an embodiment comprising only those elements essential to performing cryptographic operations as described herein. A device embodied as such would indeed provide a low-cost, low-power alternative for performing cryptographic operations only, say, as an encryption/decryption processor within a communications system. For clarity, the present inventors refer to these alternative processing elements as noted above as processors.

In addition, although the present invention has been described in terms of 128-bit blocks, it is considered that various different block sizes can be employed by merely changing the size of registers that carry input data, output data, keys, and control words.

Furthermore, although DES, Triple-DES, and AES have been prominently featured in this application, the present inventors note that the invention described herein encompasses lesser known block cryptography algorithms as well such as the MARS cipher, the Rijndael cipher, the Twofish cipher, the Blowfish Cipher, the Serpent Cipher, and the RC6 cipher. What is sufficient to comprehend is that the present invention provides dedicated block cryptography apparatus and supporting methodology within a microprocessor where atomic block cryptographic operations can be invoked via execution of a single instruction.

Also, although the present invention has been featured herein in terms of block cryptographic algorithms and associated techniques for performing block cryptographic functions, it is noted that the present invention entirely comprehends other forms of cryptography other than block cryptography. It is sufficient to observe that a single instruction is provided whereby a user can direct a conforming microprocessor to perform a cryptographic operation such as encryption or decryption, where the microprocessor includes a dedicated cryptography unit that is directed towards accomplishment of cryptographic functions prescribed by the instruction.

Moreover, the discussion of a round engine herein provides for a 2-stage apparatus that can pipeline two blocks of input data, the present inventors note that additional embodiments contemplate more than two stages. It is anticipated that stage division to support pipelining of more input data blocks will evolve in concert with dividing of other stages within a comporting microprocessor.

Finally, although the present invention has been specifically discussed as a single cryptography unit that supports a plurality of block cryptographic algorithms, the invention also comprehends provision of multiple cryptographic units operatively coupled in parallel with other execution units in a conforming microprocessor where each of the multiple cryptographic units is configured to perform a specific block cryptographic algorithm. For example, a first unit is configured for AES, a second for DES, and so on.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for performing cryptographic operations, comprising:
   an x86-compatible microprocessor;
   a control word, configured to prescribe one of a plurality of data block sizes to be employed during execution of one of the cryptographic operations, wherein said control word is stored in memory, and wherein a memory location of said control word is prescribed by contents of a register that is referenced by a single atomic cryptographic instruction, wherein said single atomic cryptographic instruction is arranged according to the instruction format for execution on said x86-compatible microprocessor;
   fetch logic, disposed within said x86-compatible microprocessor, configured to receive said single atomic cryptographic instruction as part of an instruction flow executing on said x86-compatible microprocessor, wherein said single atomic cryptographic instruction prescribes said one of the cryptographic operations, and wherein said single atomic cryptographic instruction references said control word;
   translation logic, coupled to said fetch logic, configured to translate said single atomic cryptographic instruction into a sequence of micro instructions that directs said x86-compatible microprocessor to perform said one of the cryptographic operations; and
   execution logic, disposed within said x86-compatible microprocessor and operatively coupled to said single atomic cryptographic instruction, configured to execute said one of the cryptographic operations, said execution logic comprising:
      a cryptography unit, configured to execute a plurality of cryptographic rounds on each of a plurality of input text blocks to generate a corresponding each of a plurality of output text blocks, wherein said one of a plurality of data block sizes is provided to a block size controller within said cryptography unit, wherein said block size controller employs said one of a plurality of data block sizes during execution of said one of the cryptographic operations.

2. The apparatus as recited in claim 1, wherein said one of the cryptographic operations further comprises:
   an encryption operation, said encryption operation comprising encryption of a plurality of plaintext blocks to generate a corresponding plurality of ciphertext blocks.

3. The apparatus as recited in claim 1, wherein said one of the cryptographic operations further comprises:
   a decryption operation, said decryption operation comprising decryption of a plurality of ciphertext blocks to generate a corresponding plurality of plaintext blocks.

4. The apparatus as recited in claim 1, wherein said one of a plurality of data block sizes comprises 128 bits.

5. The apparatus as recited in claim 1, wherein said one of a plurality of data block sizes comprises 192 bits.

6. The apparatus as recited in claim 1, wherein said one of a plurality of data block sizes comprises 256 bits.

7. The apparatus as recited in claim 1, wherein said one of the cryptographic operations is executed according to the Advanced Encryption Standard (AES) algorithm.

8. The apparatus as recited in claim 1, wherein said block size controller is configured to interpret a data block size field within said control word which is referenced by said single atomic cryptographic instruction.

9. The apparatus as recited in claim 1, wherein said single atomic cryptographic instruction implicitly references a plurality of registers within said x86-compatible microprocessor.

10. The apparatus as recited in claim 9 wherein said plurality of registers comprises:
    a first register, wherein contents of said first register comprise a first pointer to a first memory address, said first memory address specifying a first location in memory for access of a plurality of input text blocks upon which said one of the cryptographic operations is to be accomplished, said plurality of input text blocks are sized according to said one of a plurality of data block sizes.

11. The apparatus as recited in claim 9, wherein said plurality of registers comprises:
    a second register, wherein contents of said second register comprise a second pointer to a second memory address, said second memory address specifying a second location in said memory for storage of a corresponding plurality of output text blocks, said corresponding plurality of output text blocks being generated as a result of accomplishing said one of the cryptographic operations upon a plurality of input text blocks, wherein said plurality of input and output text blocks are sized according to said one of a plurality of data block sizes.

12. The apparatus as recited in claim 9, wherein said plurality of registers comprises:
    a third register, wherein contents of said third register indicate a number blocks within a plurality of input text blocks, wherein said plurality of input text blocks are sized according to said one of a plurality of data block sizes.

13. The apparatus as recited in claim 9, wherein said plurality of registers comprises:
    a fourth register, wherein contents of said fourth register comprise a third pointer to a third memory address, said third memory address specifying a third location in memory for access of cryptographic key data for use in accomplishing said one of the cryptographic operations.

14. The apparatus as recited in claim 9, wherein said plurality of registers comprises:
    a fifth register, wherein contents of said fifth register comprise a fourth pointer to a fourth memory address, said fourth memory address specifying a fourth location in memory, said fourth location comprising an initialization vector location, contents of said initialization vector location comprising an initialization vector or initialization vector equivalent for use in accomplishing said one of the cryptographic operations.

15. The apparatus as recited in claim 9, wherein said plurality of registers comprises:
    a sixth register, wherein contents of said sixth register comprise a fifth pointer to a fifth memory address, said fifth memory address specifying a fifth location in memory for access of said control word for use in accomplishing said one of the cryptographic operations, wherein said control word prescribes cryptographic parameters for said one of the cryptographic operations, and wherein said control word comprises:

a data block size field, configured to specify said one of a plurality of data block sizes to be employed during execution of said one of the cryptographic operations.

16. An apparatus for performing cryptographic operations, comprising:

an x86-compatible microprocessor;

a control word, configures to prescribe a block size to be employed during execution of one of the cryptographic operations, wherein said control word is stored in memory, and wherein a memory location of said control word is prescribed by contents of a register that is referenced by a single atomic cryptographic instruction, wherein said single atomic cryptographic instruction is arranged according to the instructionformat for execution on said x86-compatible microprocessor;

a cryptographic unit disposed within execution logic in said microprocessor, configured to execute said one of the cryptographic operations responsive to receipt by said x86-compatible microprocessor of said single atomic cryptographic instruction within an instruction flow that prescribes said one of the cryptographic operations, wherein said single atomic cryptographic instruction is fetched from memory by fetch logic in said x86-compatible microprocessor, and wherein translation logic in said x86-compatible microprocessor translates said single atomic cryptographic instruction into a sequence of micro instructions that directs said x86-compatible microprocessor to perform said one of the cryptographic operations; and block size logic, operatively coupled within said cryptography unit, configured to direct said x86-compatible microprocessor to employ said block size when performing said one of the cryptographic operations.

17. The apparatus as recited in claim 16, wherein said block size comprises 128-bits.

18. The apparatus as recited in claim 16, wherein said block size comprises 192-bits.

19. The apparatus as recited in claim 16, wherein said block size comprises 256-bits.

20. The apparatus as recited in claim 16, wherein said one of the cryptographic operations is executed according to the Advanced Encryption Standard (AES) algorithm.

21. The apparatus as recited in claim 16, wherein said block size logic is configured to interpret a data block size field within said control word which is referenced by said single atomic cryptographic instruction.

22. A method for performing cryptographic operations in a device, the method comprising:

via fetch logic disposed within an x86-compatible microprocessor, fetching a single atomic cryptographic instruction from memory that prescribes one of a plurality of cryptographic operations, and via translation logic disposed within the x86-compatible microprocessor, translating the single atomic cryptographic instruction into a sequence of micro instructions that direct the x86-compatible microprocessor to perform the one of the plurality of cryptographic operations, wherein the single atomic cryptographic instruction is arranged according to the instruction format for execution on the x86-compatible microprocessor;

via a field within a control word that is referenced by the single atomic cryptographic instruction, specifying particular data block size to be employed during execution of one of a plurality of cryptographic operations, and via a cryptography unit disposed within execution logic in the x86-compatible microprocessor, employing the particular data block size when performing the one of the cryptographic operations.

23. The method as recited in claim 22, wherein said specifying comprises:

prescribing 128 bits as the particular block size.

24. The method as recited in claim 22, wherein said specifying comprises:

prescribing 192 bits as the particular block size.

25. The method as recited in claim 22, wherein said specifying comprises:

prescribing 256 bits as the particular block size.

26. The method as recited in claim 22, wherein said employing comprises:

executing the one of the cryptographic operations according to the Advanced Encryption Standard (AES) algorithm.

* * * * *